United States Patent
Arnold et al.

(10) Patent No.: US 8,729,747 B2
(45) Date of Patent: May 20, 2014

(54) METHOD AND APPARATUS FOR MOTIONAL/VIBRATIONAL ENERGY HARVESTING VIA ELECTROMAGNETIC INDUCTION

(75) Inventors: David P. Arnold, Gainesville, FL (US); Benjamin James Bowers, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 283 days.

(21) Appl. No.: 12/848,606

(22) Filed: Aug. 2, 2010

(65) Prior Publication Data

US 2011/0187207 A1 Aug. 4, 2011

Related U.S. Application Data

(63) Continuation-in-part of application No. PCT/US2009/032867, filed on Feb. 2, 2009.

(60) Provisional application No. 61/025,698, filed on Feb. 1, 2008, provisional application No. 61/286,603, filed on Dec. 15, 2009.

(51) Int. Cl.
*H02K 35/02* (2006.01)
*H02K 35/00* (2006.01)
*H01F 41/08* (2006.01)

(52) U.S. Cl.
USPC .............. 310/34; 310/23; 310/30; 310/15; 310/36; 310/14

(58) Field of Classification Search
USPC .............. 310/34, 23, 30, 14, 15, 36
IPC .............. H01F 41/08; H02K 35/02,35/00
See application file for complete search history.

(56) References Cited

U.S. PATENT DOCUMENTS

| 799,305 A | 9/1905 | Crouch et al. |
| 5,818,132 A | 10/1998 | Konotchick |
| 6,178,079 B1 * | 1/2001 | Renger ............... 361/118 |
| 6,246,561 B1 | 6/2001 | Flynn |

(Continued)

FOREIGN PATENT DOCUMENTS

| JP | 2003-088091 | 3/2003 |
| KR | 2002-0017163 | 3/2002 |
| WO | WO02103881 | * 12/2002 ............... H02K 1/00 |

OTHER PUBLICATIONS http://www.physics.ohio-state.edu/~gan/teaching/spring99/C11.pdf, OState,Jul. 2010.*

(Continued)

*Primary Examiner* — Terrance Kenerly
(74) *Attorney, Agent, or Firm* — Saliwanchik, Lloyd & Eisenschenk

(57) ABSTRACT

A method and apparatus for motional/vibrational energy harvesting are disclosed. Embodiments of the subject invention utilize the non-resonant chaotic behavior of a free-rolling magnet to generate power. In one embodiment, the magnet can be spherical, cylindrical, or elliptical. The magnet can roll about a linear, cylindrical, helical, or cage-like track. The changing magnetic flux due to the magnet rolling about the track induces current in surrounding coils. The coils can be provided around the track using a continuous winding placement, segmented winding placement, or fractional winding placement. Multiple coil phases are also possible. For embodiments utilizing multiple magnets, spacers can be used to maintain a separation between magnets.

70 Claims, 24 Drawing Sheets

(56) References Cited

U.S. PATENT DOCUMENTS

| | | | |
|---|---|---|---|
| 6,705,776 B2 | 3/2004 | Watanabe | |
| 7,009,310 B2 | 3/2006 | Cheung et al. | |
| 7,089,043 B2 | 8/2006 | Tu et al. | |
| 2001/0013726 A1* | 8/2001 | Katagiri et al. | 310/67 R |
| 2004/0071308 A1* | 4/2004 | Guenther | 381/409 |
| 2004/0104623 A1 | 6/2004 | Nakano et al. | |
| 2004/0245881 A1* | 12/2004 | Kadoya et al. | 310/185 |
| 2004/0262846 A1* | 12/2004 | Anzai et al. | 277/410 |
| 2005/0274336 A1* | 12/2005 | Wagner et al. | 123/90.12 |
| 2006/0208600 A1* | 9/2006 | Sahyoun | 310/254 |
| 2007/0159011 A1 | 7/2007 | Terzian et al. | |
| 2007/0205691 A1* | 9/2007 | Hattori et al. | 310/311 |
| 2007/0242406 A1 | 10/2007 | Annis et al. | |
| 2008/0008609 A1* | 1/2008 | Pate et al. | 417/415 |
| 2008/0074083 A1 | 3/2008 | Yarger et al. | |
| 2008/0174281 A1* | 7/2008 | Shau | 322/1 |

OTHER PUBLICATIONS

Arnold, D.P., "Review of Microscale Magnetic Power Generation," *IEEE Transactions on Magnetics*, Nov. 2007, pp. 3940-3951, vol. 43, No. 11.

Beeby, S.P., et al., "Energy Harvesting Vibration Sources for Microsystems Applications," *Measurement Science and Technology*, Oct. 2006, pp. R175-R195, vol. 17.

Bowers, B.J., et al., "Spherical, Rolling Magnet Generators for Passive Energy Harvesting from Human Motion," Aug. 2009, *Journal of Micromechanics and Microengineering*, Article No. 094008, vol. 19.

Leong, W.L., et al., "Human Power Harvesting," May 2004, Senior Design Project, Department of Electrical and Computer Engineering, University of Florida.

Mitcheson, P.D., et al., "Performance Limits of the Three MEMS Inertial Energy Generator Transduction Types," Aug. 2007, *Journal of Micromechanics and Microengineering*, pp. S211-S216, vol. 17.

Shenck, N.S., et al., "Energy Scavenging with Shoe-Mounted Piezoelectrics," *IEEE Micro*, Jun. 2001, pp. 30-42, vol. 21, No. 3.

\* cited by examiner

METHOD AND APPARATUS FOR MOTIONAL/VIBRATIONAL ENERGY HARVESTING VIA ELECTROMAGNETIC INDUCTION

CROSS-REFERENCE TO RELATED APPLICATIONS

This application is a continuation-in-part of International Patent Application No. PCT/US2009/032867, filed Feb. 2, 2009, which claims the benefit of U.S. Provisional Application Ser. No. 61/025,698, filed Feb. 1, 2008, and this application claims the benefit of U.S. Provisional Application Ser. No. 61/286,603, filed Dec. 15, 2009, the disclosures of which are hereby incorporated by reference in their entireties, including any figures, tables, or drawings.

BACKGROUND OF INVENTION

Long lasting, high power density power sources are important to enable emerging technologies such as wireless sensor networks, robotic platforms, and electronic devices for consumer, military, medical, aerospace and other applications. To meet the energy demands for these applications, devices that scavenge power from the environment (e.g., solar, thermal, vibrations) are of great practical interest. Various energy harvesting and scavenging methods exist for capturing and storing energy from normally occurring environmental sources, such as thermal, solar, or vibrational. For applications on moving platforms, vibrational energy harvesters are advantageous since solar or thermal energy may not be available under all operating conditions.

Current research has focused on a variety of vibrational energy harvesting devices. For example, micromachining and micro-electro-mechanical system (MEMS) technologies have been used to produce sub-millimeter microchip-sized devices, but the power output from these miniaturized devices has been very low (often nW-μW level), which appears to be too small to power many practical devices. The paper entitled "Performance limits of the three MEMS inertial energy generator transduction types," by P. D. Mitcheson, et al. (*J. Micromech. Microeng.*, vol. 17, S211-S216, 2007) shows that the power density scales unfavorably with length scale.

FIG. 1A shows an example of a vibrational energy harvester by PMG Perpetuum. As shown in FIG. 1A, the vibrational energy harvester is almost the size of an apple, thus the low power density provided by vibrational energy harvesters creates a trade-off between size and power. Specifically, to achieve higher power, the size of the harvester needs to be larger. FIG. 1B shows a schematic of an inertial vibrational energy harvester, which can be piezoelectric, capacitive, or magnetic.

As noted by S. P. Beeby et al. in "Energy harvesting vibration sources for microsystems applications," (*J. Measurement Science and Technology*, vol. 17, pp. R175-R195, 2006) and D. P. Arnold in "Review of microscale magnetic power generation," (*IEEE Trans. Magn.*, vol. 43, no. 11, pp. 3940-3951, 2007), devices that use electromagnetic transduction schemes have generally shown higher power densities (up to 2 mW/cm$^3$) when compared to electrostatic and piezoelectric approaches.

Most of the current systems are fairly high-Q resonant mass-spring-damper style devices designed for maximum performance at only one narrowly defined frequency. In fact, most resonant devices can operate at only one single frequency, but many naturally occurring vibrations have broadband frequency content. This narrowband frequency response is especially problematic for micromachined devices, which typically possess resonant frequencies in excess of 1 kHz, well above the frequency range of mechanically- or human-induced vibrations (1-500 Hz).

Additionally, most current systems only respond to one axial direction of motion. For many naturally occurring vibrations, e.g. human motion, vehicle motion, energy harvesters are desired that can capture the complex six-degree-of-freedom linear and rotational motions.

Moreover, prototypes have successfully demonstrated electrical power extraction, but conversion and regulation of the extracted electrical power to the appropriate voltage/current levels for compatibility with electronic devices continues to present engineering challenges. Conventional power electronic circuit approaches currently do not appear to function efficiently at the low voltages and currents supplied by a typical vibrational energy harvester.

BRIEF SUMMARY

Embodiments of the subject invention relate to a method and apparatus for producing an electric current. Embodiments of the subject invention also pertain to a method and apparatus for motional/vibrational energy harvesting via electromagnetic induction. Specific embodiments relate to non-resonant motional/vibrational energy harvesting. According to certain embodiments of the present invention, energy is generated by one or more magnets that roll along a track and induce current in coil windings.

In one embodiment, the one or more magnets can be spherical, cylindrical, or elliptical. The track for the one or more magnets can be, for example, linear, cylindrical, helical, or cage-like. One or more coils can be positioned with respect to the track such that as the magnet(s) roll, electric current is created in the one or more coils via the changing magnetic fields. The one or more coils, or windings, can be positioned with respect to the track using a continuous winding placement, segmented winding placement, or fractional winding placement. Multiple coils can be positioned with respect to the rotational motion of the magnet to allow generation of multi-phase power, for example, 2-phase, or 3-phase. For embodiments utilizing multiple magnets, spacers can be used to maintain a separation between magnets.

Applications of the non-resonant motional/vibrational energy harvesting devices include, but are not limited to consumer electronics, military subsystems, robotic platforms, and sensor networks. According to embodiments of the present invention, external motion causes the magnet to roll through a track and thus generate power.

DETAILED DISCLOSURE

Embodiments of the subject invention relate to a method and apparatus for producing an electric current. Embodiments of the subject invention also pertain to a method and apparatus for motional/vibrational energy harvesting via electromagnetic induction. Specific embodiments relate to non-resonant motional/vibrational energy harvesting. Embodiments of the subject invention utilize the non-resonant chaotic behavior of a free-rolling magnet to generate power.

Embodiments of the subject invention relate to a compact electromagnetic generator architecture capable of enabling high-energy-density motional power sources. Applications of the electromagnetic generator architecture of the present invention include, but are not limited to, consumer electronics, military subsystems, robotic platforms, and sensor networks. Embodiments of the subject power source incorporate a free-rolling magnet that generates power in surrounding coils via magnetic induction. The magnet can have a variety of shapes such as cylindrical, spherical, or elliptical. In a specific embodiment, the magnets are magnetized transverse to the axis of rotation. In a specific embodiment, a cylindrical magnet is magnetized transverse to the axis of the cylinder. In further specific embodiments, the magnets have an n-pole design where n is greater than 2. Other magnetic arrangements can also be used. The electromagnetic generator device can be designed such that external motion causes a magnet to roll through a track or within the confines of a cage and thus generate power. This principle has fundamental similarities to consumer "shake-light" emergency flashlights, but offers avenues for miniaturization and significantly higher power density via rotational, rather than translational, motion.

Additionally, an un-tethered, free-rolling magnet, as used in embodiments of the present invention, enables energy harvesting over a range of vibrational frequencies and amplitudes without requiring a specific vibrational signature. This is in contrast to resonant mass-spring-damper energy harvesting systems, which require periodic vibrations at a single specific frequency and exhibit unfavorable scaling for miniaturization. Also, lower vibration amplitudes are required to induce a rolling motion, as compared to a sliding motion.

Figure 1A:
FIGS. 1A and 1B show an example of an inertial vibrational energy harvester and mechanical schematic, respectively.
Figure 1B:
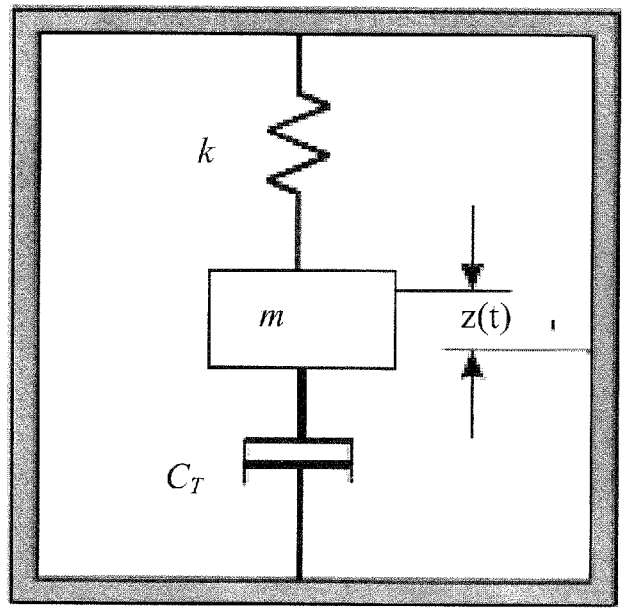
Figure 2:
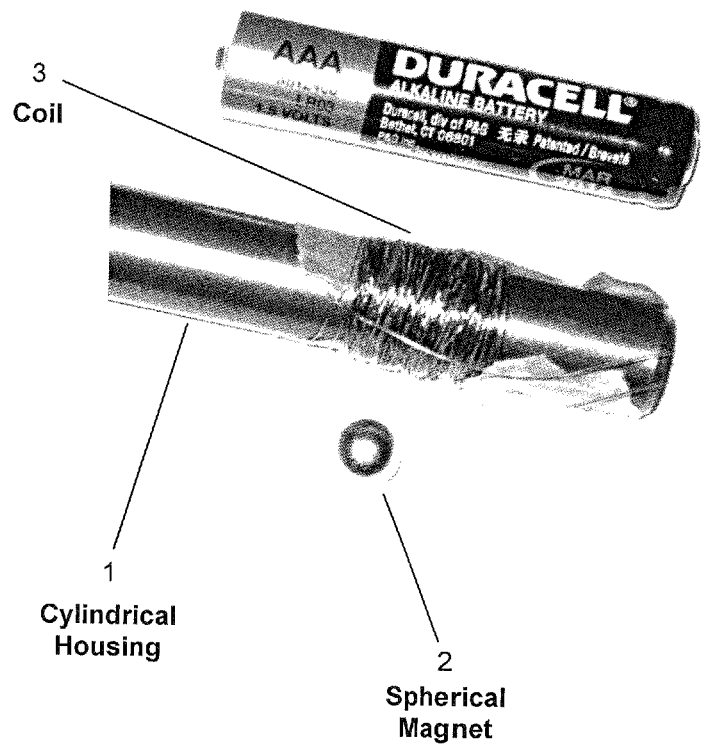
FIG. 2 shows a design in accordance with embodiments of the subject invention.
Figure 3:
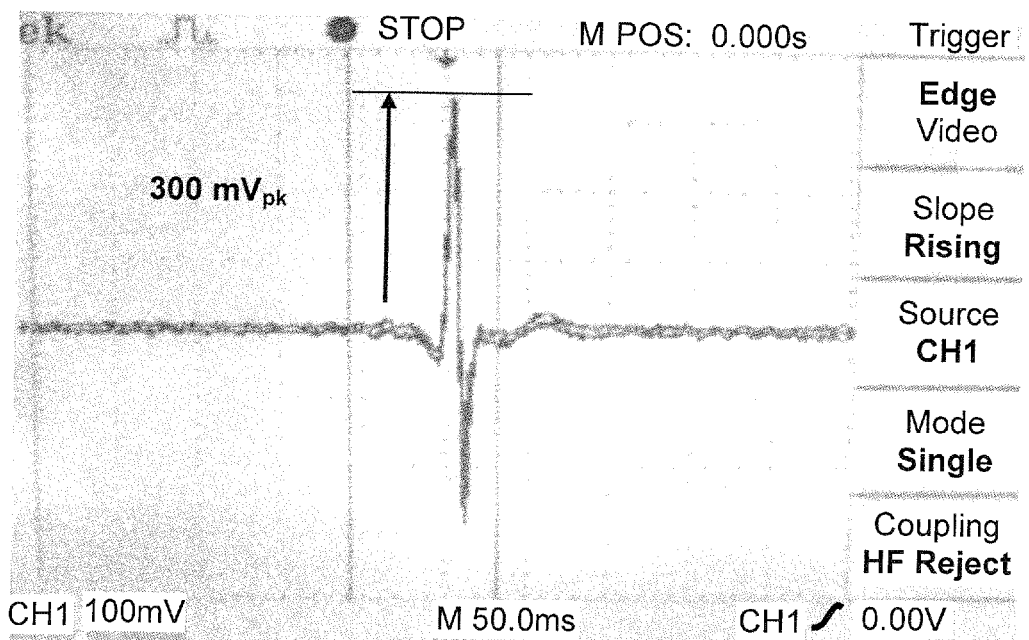
FIG. 3 shows the measured voltage waveform for a single pass of the rolling magnet with respect to the embodiment shown in FIG. 2.

FIG. 2 shows an embodiment having a cylindrical housing 1 providing a linear track for a spherical magnet 2 and coils 3 winding around the housing 1. FIG. 3 illustrates an example of the energy generating behavior of a rolling magnetic harvester according to the embodiment shown in FIG. 2. The device shown in FIG. 2 includes, an 8 mm diameter, 4.5 cm long tube, (shown in FIG. 2 to be about the size of a AAA battery) with a 6 mm diameter spherical magnet and ~200 turns of 34 gage copper wire wrapped around the tube. As shown in FIG. 3, this embodiment can exhibit output voltages in excess of 300 mV$_{pk}$, and 50 ms power bursts of ~6 mW (~0.3 mJ of energy) each time the magnet rolls through the coil section. These power/energy density levels (2.6 mW/cm$^3$) are significant compared to previous vibrational energy harvesting efforts, which are typically in the 0.1 mW/cm$^3$ range.

Embodiments of the non-resonant, electromagnetic, mesoscale (millimeter-centimeter length scale) energy harvesting devices can generate "useful" amounts of power from naturally occurring, time-varying vibrational conditions. Embodiments can incorporate power rectification and regulation techniques to interface between the energy harvester and the load electronics, including advanced circuit techniques and electromechanical rectification devices.

Figure 4:
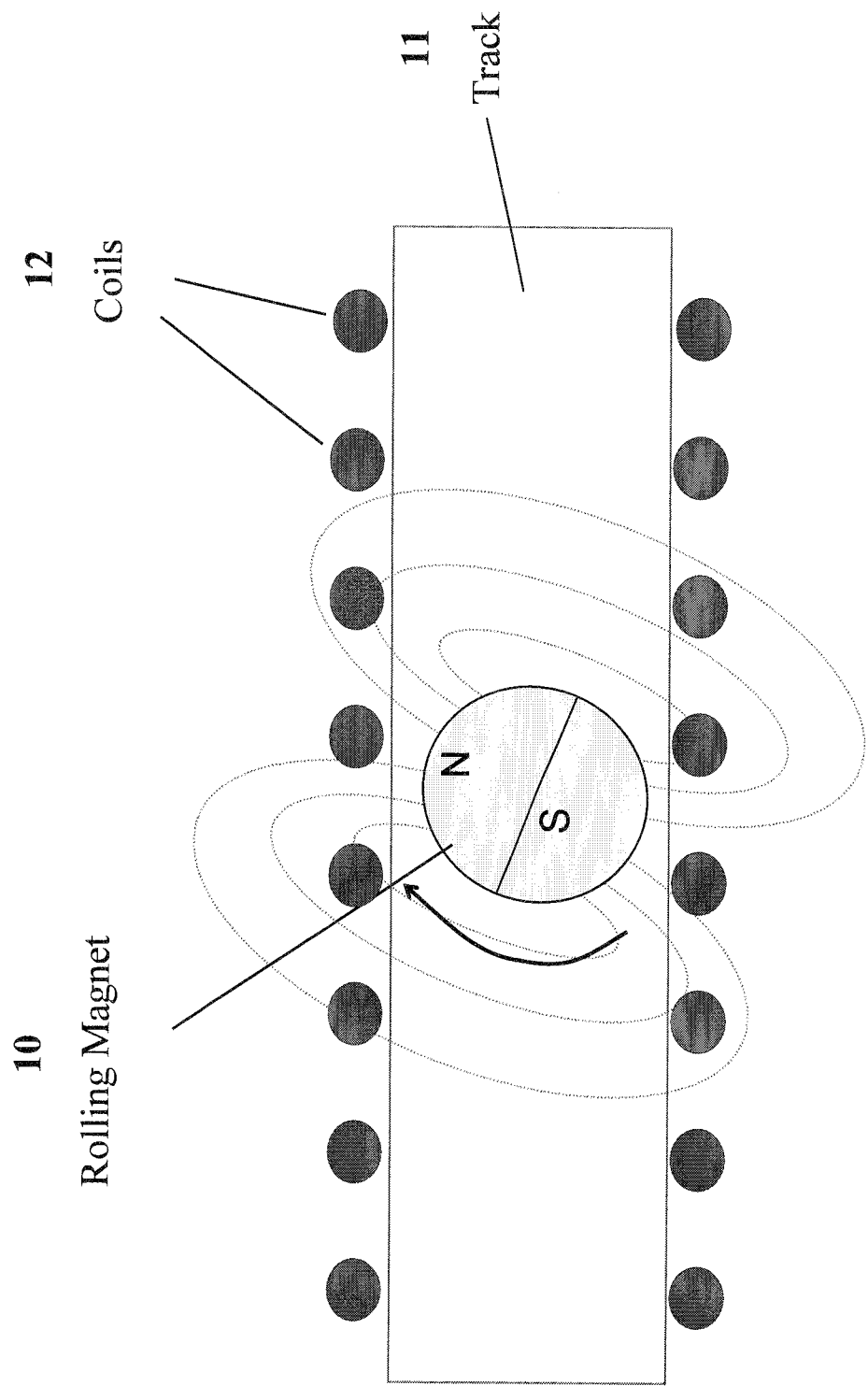
FIG. 4 shows a non-resonant device architecture using rolling magnets according to an embodiment of the present invention.

FIG. 4 shows how the non-resonant device architecture using rolling magnets works, by utilizing external motion to cause a magnet 10 to roll in a track 11. This motion may be periodic or chaotic. The changing magnetic flux due to the moving magnet 10 induces current in surrounding coils 12. Embodiments of the present invention work by using input vibrational energy. Advantageously, vibrational energy is usually available. Here, larger vibrations can provide larger output power. As indicated by the results shown in FIG. 3 and device testing, electromagnetic induction offers high power density and good reliability.

Figure 5:
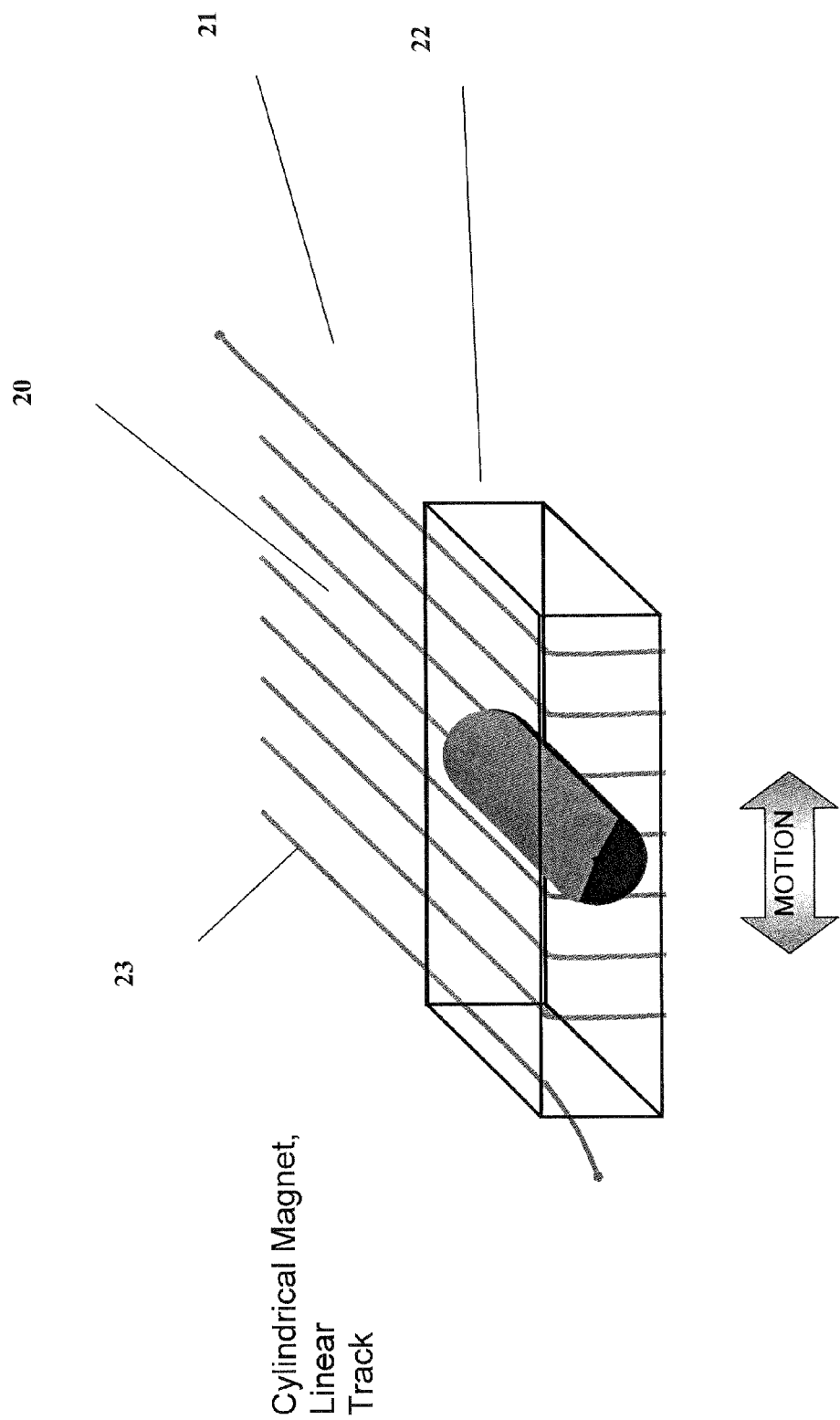
FIG. 5 shows a non-resonant magnetic energy harvester incorporating a cylindrical magnet along a linear track according to an embodiment of the present invention.

FIG. 5 shows an embodiment of an energy harvesting device generator according to the present invention. Referring to FIG. 5, a cylindrical magnet 20 is provided in a housing 21 such that the cylindrical magnet 20 can roll along a linear track 22. Coils 23 can be wound around the housing 21 perpendicular to the linear track 22. In certain embodiments, the cylindrical magnet can yield higher output power compared to a spherical magnet provided along a linear track. Other shaped magnets can be used, such as magnets having ellipsoidal cross-sections or other cross-sectional shapes that allow rotational movement.

Figure 6:
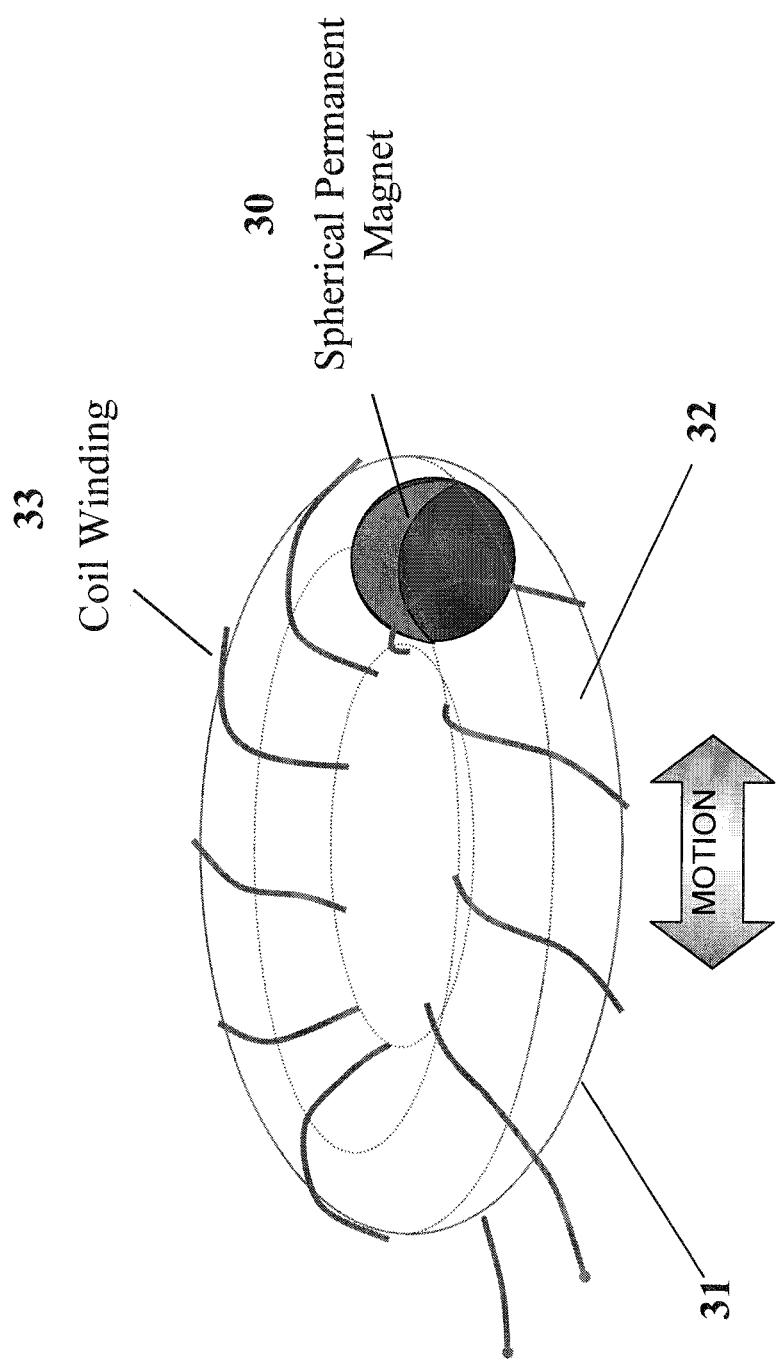
FIG. 6 shows a spherical magnet in a circular track according to an embodiment of the present invention.

FIG. 6 shows another embodiment of a energy harvesting device generator according to the present invention. Referring to FIG. 6, a spherical magnet 30 can be provided in a tubular or cylindrical holder 31 such that the spherical magnet 30 can roll along a circular track 32. Coils 33 can be wound around the holder 31. In certain embodiments, the use of circular tracks enable semi-continuous pulse trains as the magnet perpetually rolls. Other shapes for tracks can be used and other cross-sectional shapes from the tracks can be used. Preferably, the track allows continuous motion around the track in both directions. In addition, other shaped magnets can also be used besides spherical, such as shapes that allow rotational motion in the track.

Although linear (straight) and cylindrical tracks are shown in the embodiments described with respect to FIGS. 5 and 6, helical tracks can also be used. In addition, a spherical magnet or cylindrical magnet can be used with any shaped track.

Figure 7:
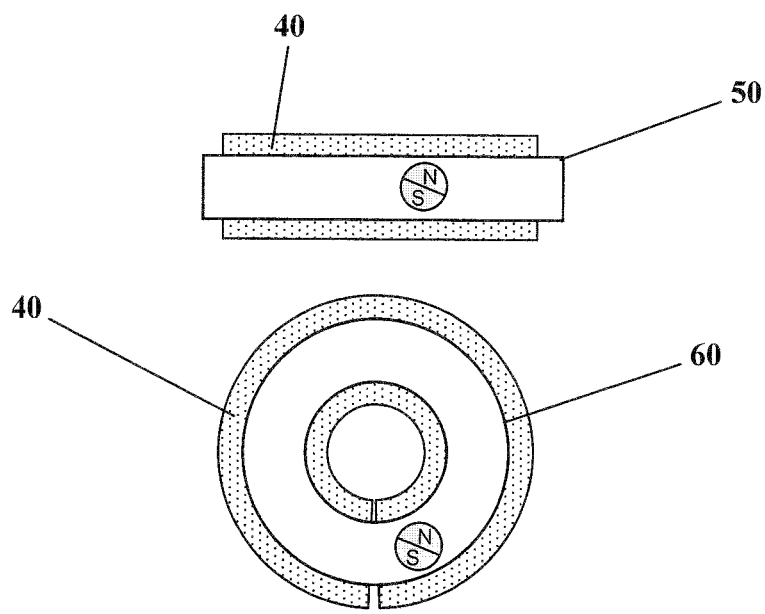
FIG. 7 shows a continuous winding according to an embodiment of the present invention.
Figure 8:
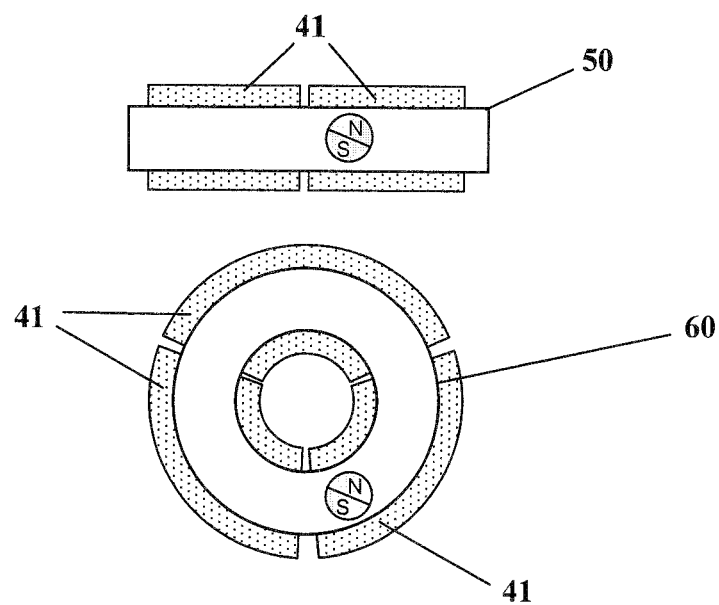
FIG. 8 shows segmented windings according to an embodiment of the present invention.
Figure 9:
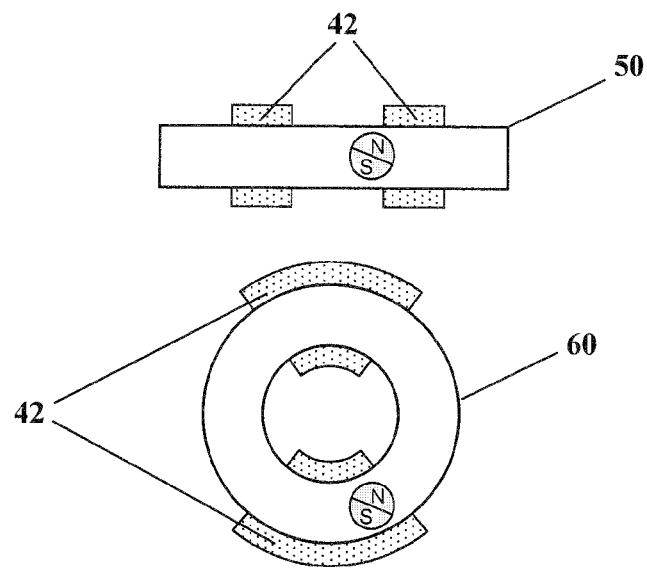
FIG. 9 shows fractional windings according to an embodiment of the present invention.

In further embodiments, coil placement along the tracks can be used to effect power generation. In some embodiments, multiple coil sets can be provided on a single track. The placement and spacing can be selected for power optimization or maximization. FIGS. 7-9 illustrate a few example coil placements according to embodiments of the present invention. FIG. 7 shows continuous winding placement 40 for a linear track 50 and cylindrical track 60, respectively. FIG. 8 shows segmented windings placement 41 for a linear track 50 and cylindrical track 60, respectively. FIG. 9 shows fractional windings placement 42 for a linear track 50 and cylindrical track 60, respectively.

In one embodiment, multiple coil phases (e.g. a 2-phase or 3-phase machine) can be utilized.

In certain embodiments, the coil windings can be micro-machined. In a specific embodiment, the coils can be electroplated windings patterned onto the surface of a track.

Figure 10:
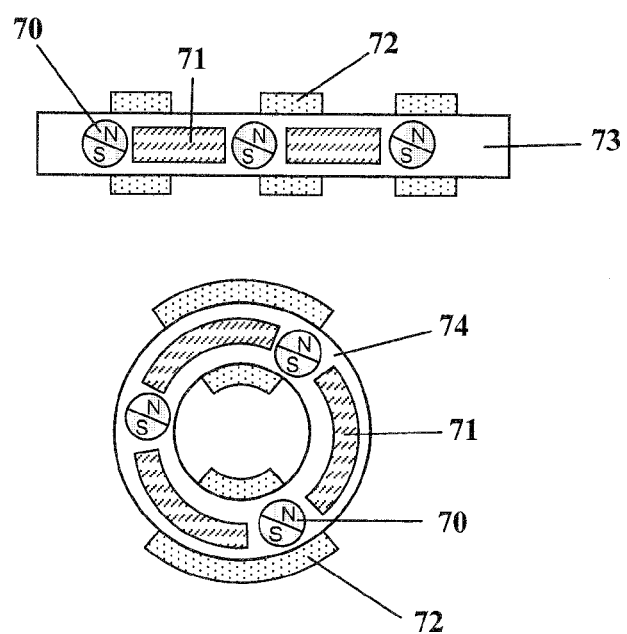
FIG. 10 shows multiple balls with separators according to an embodiment of the present invention.

In further embodiments, more than one magnet can be used on a single track. In an embodiment, two or more of the multiple magnets can be separated by a spacer. FIG. 10 shows a specific embodiment utilizing multiple magnets separated by spacers. Although FIG. 10 shows three magnets 70 separated by a spacer 71 and fractional windings 72 along a linear 73 and cylindrical path 74, respectively, embodiments are not limited thereto.

Figure 11:
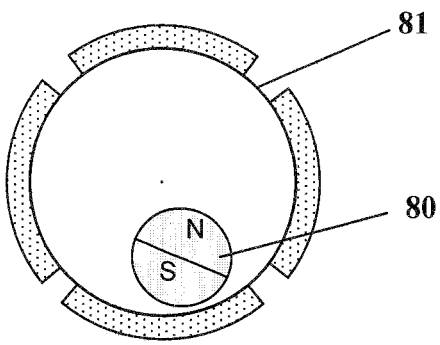
FIG. 11 shows a cross-section of a spherical magnet in a spherical cage according to an embodiment of the present invention.
Figure 12:
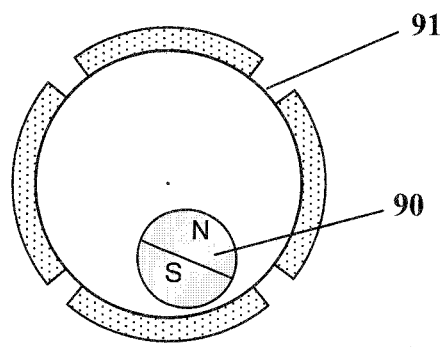
FIG. 12 shows a cross-section of a cylindrical magnet in a cylindrical cage according to an embodiment of the present invention.

FIGS. 11 and 12 show respective cross-sections for a spherical magnet 80 in a spherical cage 81 and a cylindrical magnet 90 in a cylindrical cage 91. In this embodiment, the magnet can roll in any orientation.

First-order electromagnetic models indicate that the power density (PD=power per unit volume) of a rolling (rotational) energy harvester scales independent of size: $PD \propto Nv^2 B_r^2$, where N is the number of coil turns, v is the magnet velocity, and $B_r$ is the magnet remanence. In contrast, the power density of a conventional translational electromagnetic power generator scales as: $PD \propto aNv^2 B_r^2$. Here, the additional factor a is a characteristic length scale, e.g., the diameter, indicating unfavorable scaling with size reduction. Physically, a rolling generator overcomes the unfavorable scaling found in a translational vibrational energy harvester, since the angular velocity of a rolling object increases with decreasing size (assuming equal linear translational velocities).

Implementation of energy harvesting in a distributed power system in accordance with embodiments of the invention can utilize miniaturization and optimization. Miniaturization may be accomplished through multiple advanced manufacturing technologies such as micromachining and printed circuit board manufacturing to create a hybrid structure. A combination of conventional machining, printed circuit board techniques, and/or micromachining/microfabrication strategies may be used to manufacture miniaturized devices. In one embodiment, magnets can be formed of NdFeB, and bulk-machined. The coils and tracks can be microfabricated.

Embodiments of the present invention can be applied to integrated and distributed power systems where multiple motional power sources are seamlessly integrated into a system platform. One application of the present invention is for integrated soldier power for the Army's Future Force Warrior. Energy harvesters can be integrated into the combat uniform where motion is most likely to occur (e.g., arms and/or legs). The total system mass would then be evenly distributed over the soldier's body to enhance soldier mobility, stealth, and lethality. While the limited power density of existing energy harvesting technologies make them impractical for meeting all of the power needs of a fully equipped soldier (in excess of 25 W), the passive energy harvesting system according to certain embodiments of the present invention can power smart subsystems such as physiological or environmental sensors, short-range tactical voice/data communications systems, or other low-power systems.

Figure 22:
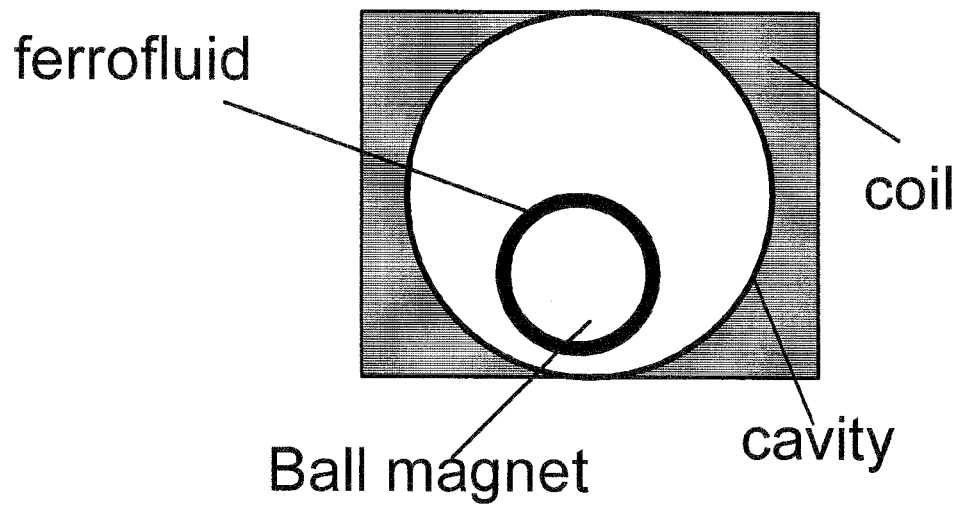
FIG. 22 shows an embodiment having ferrofluid inside the cavity, where a small amount of ferrofluid can reduce friction between the ball magnet and the cavity as the ferrofluid is attracted to the surface of the ball magnet.
Figure 23:
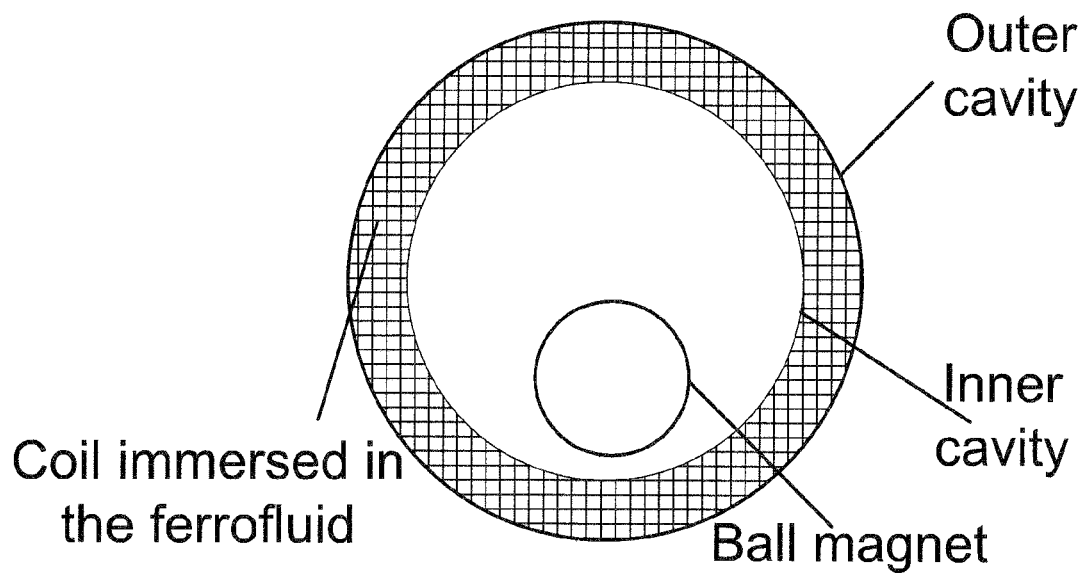
FIG. 23 shows an embodiment having ferrofluid outside the cavity, where the coil is immersed in the ferrofluid such that the magnetic field through the coil is strengthened due the relatively high permeability of the ferrofluid.

Specific embodiments of the subject invention relate to enhancing the performance of the electromagnetic induction for various magnet and coil structures by, for example, strengthening the magnetic field created by the moving magnet and/or controlling the position of the magnetic field created by the moving magnet. One or more of the features described in reference to FIGS. 22-31 can be incorporated with the embodiments shown in FIGS. 4-13. In an embodiment, a ferrofluid may be used either inside the cavity or outside the cavity the magnet is positioned within, in order to increase the permeability of the surrounding media, so that the magnetic field can be concentrated. FIG. 22 shows an embodiment that uses a ferrofluid inside the cavity. Referring to FIG. 22, a small amount of ferrofluid can reduce friction between the ball magnet and the cavity as the ferrofluid is attracted to the surface of the ball magnet. FIG. 23 shows an embodiment that uses a ferrofluid outside the cavity. Referring to FIG. 23, the coil is immersed in the ferrofluid such that the magnetic field through the coil is strengthened due to the relatively high permeability of the ferrofluid. In another embodiment, a coil incorporating a ferromagnetic material can be used.

In a specific embodiment, a coil incorporating a ferromagnetic material, such as nickel clad copper wire, can be used so that the magnetic field strength can be amplified around the wire. In this way, the coil itself can function as the ferrofluid, as shown in FIG. 23, as the coil has a high permeability.

Figure 24:
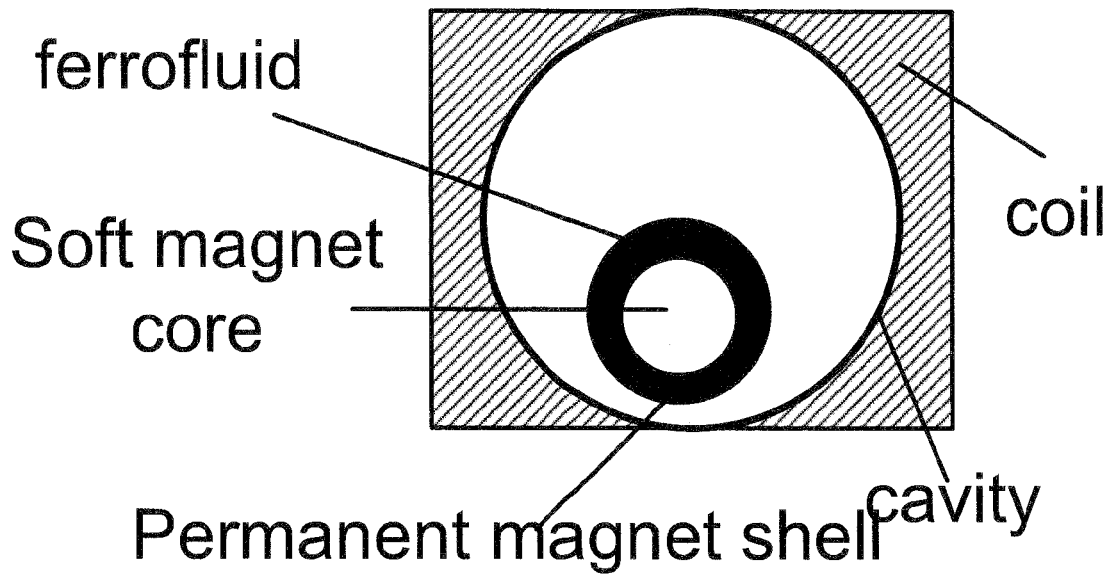
FIG. 24 shows an embodiment having a permanent magnet shell with high permeability core material.

In further embodiments, soft magnetic "inserts" may be inserted within the coil regions to help guide and concentrate the magnetic flux across the coils. Similar to the embodiment shown in FIG. 2, which uses a ferrofluid, inserts incorporating ferromagnetic materials can be used to make part, or all, of the outer cavity, where the ferromagnetic material has a high permeability. In further embodiments, a permanent magnet shell with high permeability material inside may also be used in order to reduce the total reluctance of the sphere and thus increase the overall magnetic flux. FIG. 24 shows an embodiment having a soft magnet core with a ferrofluid coating around the soft magnet core, where a permanent magnet shell is used to house the soft magnet core.

Figure 25:
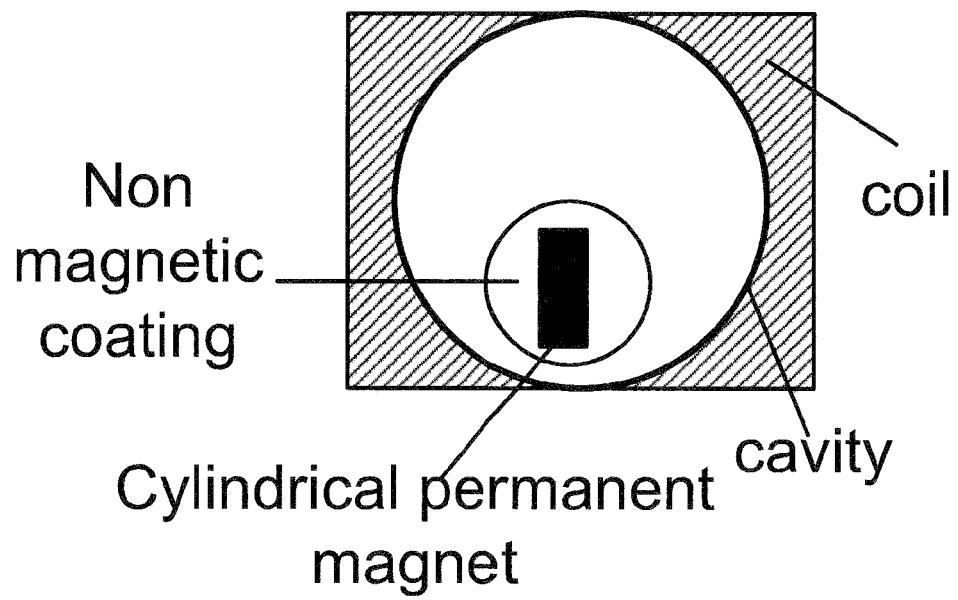
FIG. 25 shows an embodiment having a cylindrical magnet embedded in a non magnetic spherical coating, where the cylindrical magnet generates higher magnetic flux than a spherical magnet, and the non-magnetic spherical coating creates a spherical shape that is favorable mechanically.
Figure 26:
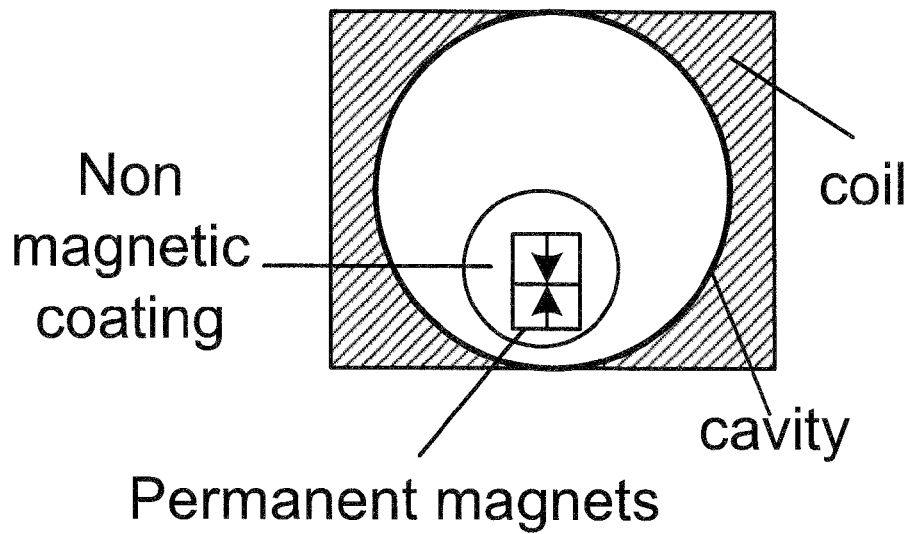
FIG. 26 shows an embodiment having two opposing magnets embedded in a non magnetic coating.

In yet further embodiments, a magnet can be embedded in a non-magnetic or ferromagnetic coating or housing that creates a different outer topology than the outer topology of the magnet. FIG. 25 shows an embodiment where a cylindrical magnet is embedded in a non-magnetic spherical coating, or housing, in order to reduce the demagnetization factor. The embodiment shown in FIG. 25 can take advantage of the higher magnetic flux created by a cylindrical magnet and enjoy benefits of a spherical outer topology. Multiple magnets can be embedded in a non-magnetic coating, or housing, to create optimal magnetic field patterns. FIG. 26 shows an embodiment having two opposing magnets embedded in a spherical shaped non-magnetic coating. In yet still further embodiments, the design of the magnetic shielding may be optimized for magnetic field strengthening and directing purpose. Where typical magnetic shielding design is for the sole purpose of shielding, embodiments of the subject invention can use the shielding to strengthen and/or direct the magnetic fields.

Figure 27:
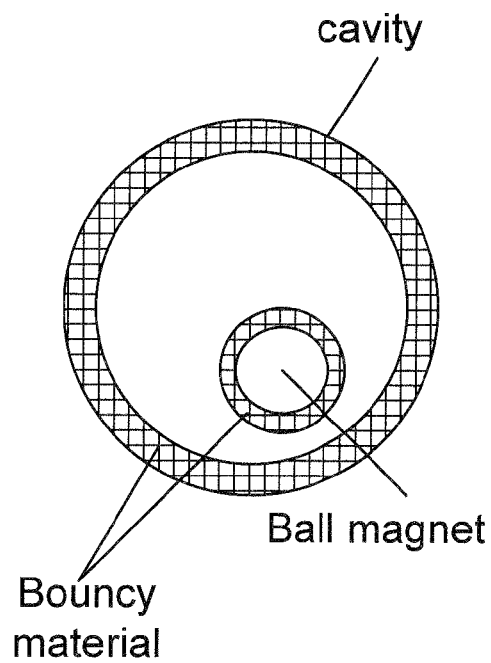
FIG. 27 shows an embodiment having use of an elastic material on the inside surface of the cavity on the outer surface of the magnet.

Further specific embodiments of the subject invention relate to enhancing the dynamic rotational and/or linear motion of the magnet. One or more of the following described modifications can be incorporated with the embodiments shown in FIGS. 4-13. In one embodiment, coating layers or materials may be used on the cavity wall and/or sphere to create more bouncing activity to, for example, create a super-bouncy ball. FIG. 27 shows an embodiment having an elastic, or bouncy, material on the outer surface of the magnet and on the inner surface of the cavity.

Figure 28:
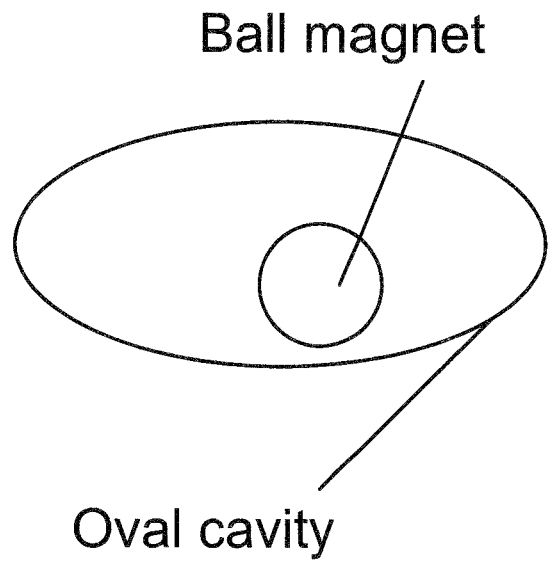
FIG. 28 shows an embodiment having an oval cavity.
Figure 29:
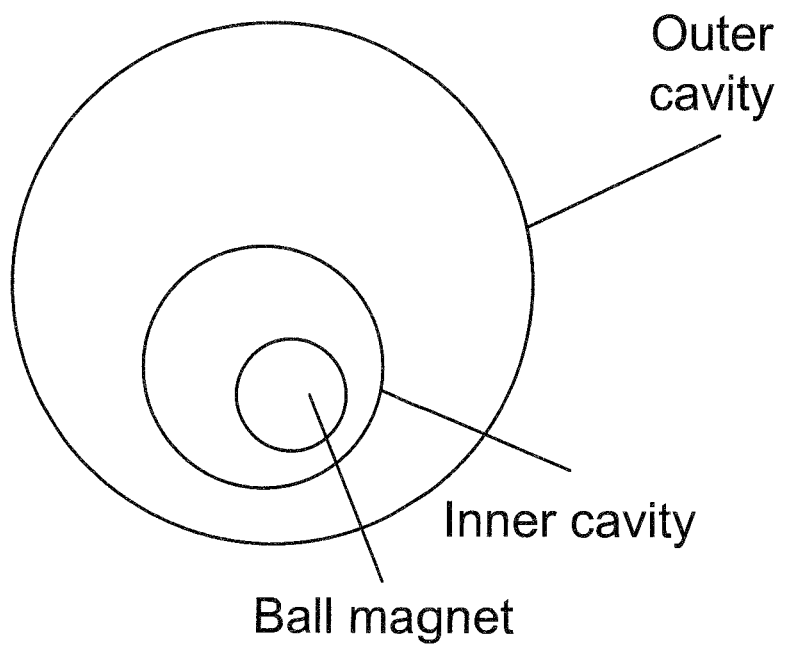
FIG. 29 shows an embodiment having a second degree of freedom, where the inner cavity can roll inside the outer cavity with a ball magnet inside of the inner cavity.
Figure 30:
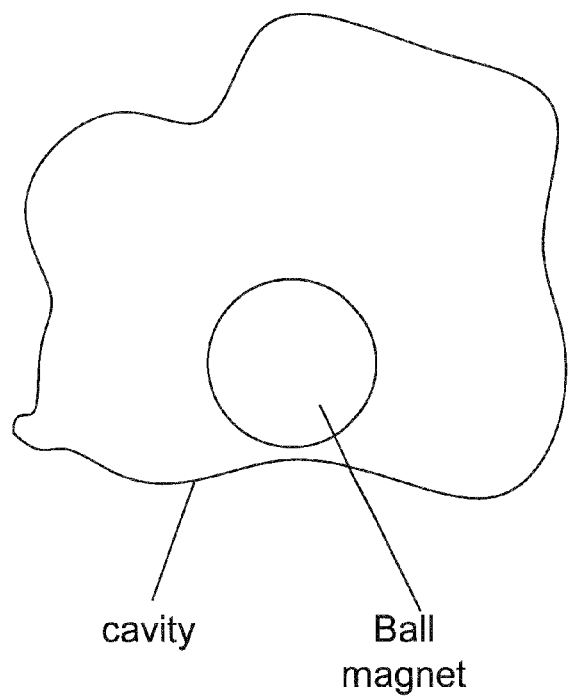
FIG. 30 shows an embodiment having an irregular cavity shape.
Figure 31:
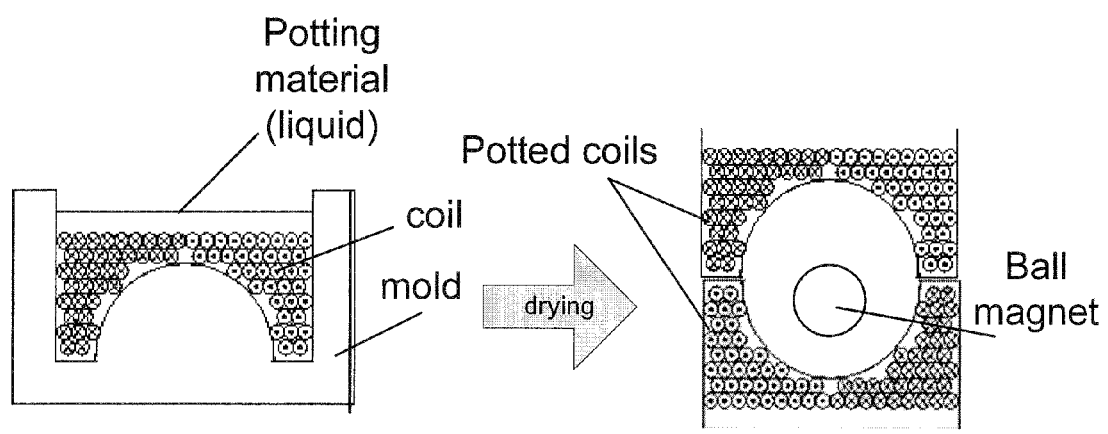
FIG. 31 shows a process flow for coil potting in accordance with an embodiment of the subject invention.

In another embodiment, a "non-perfect" spherical cavity, such as an oval cavity, or a cavity with a partially flattened wall may be used to increase the sustaining time of the motion. FIG. 28 shows an embodiment with an "oval shaped" spherical cavity. In further embodiments, a second degree of freedom may be introduced between the cavity and the package, so that the cavity may move more freely with respect to the package. FIG. 29 shows the use of a ball magnet inside an inner cavity where the inner cavity is positioned, and can move within, an outer cavity. In further embodiments, a lubricating fluid may be applied in order to create a lubricated contact surface between the sphere and cavity wall. In yet further specific embodiments, a ferrofluid may be applied to the magnet so that the lubricating film around the magnet reduces friction. In still yet further embodiments, the cavity wall may be bumpy or contain ridges rather than being smooth so to create additional motion. FIG. 30 shows the use of an irregular inner surface cavity contour.

Still yet further specific embodiments of the subject invention relate to enhancing the manufacturing method of the spherical cavity. In one embodiment, coil potting techniques and/or injection molding techniques may be used to form the spherical cavity. In the embodiment shown in FIG. 31 a process is shown where, a very thin wall can be formed, and the coils can be fixed simultaneously.

Another application of the present invention is for sensor data-loggers for shipping containers or tracking devices. When mounted on a shipping container or specific shipping item the energy harvester would collect energy during shipment sufficient to power sensors that may record temperature, shock, humidity, magnetic fields, or a variety of other measurable quantities. This data would be used to determine where damage may have occurred in shipping a fragile item, or to ensure quality/freshness of fresh grocery produce.

EXAMPLE 1

A specific embodiment of the invention is directed to a method and apparatus incorporating a non-resonant, vibrational energy harvester architecture intended for human-motion energy scavenging. The design utilizes a unidirectionally-magnetized (NdFeB) permanent magnet ball that rolls and translates inside a spherical housing when subjected to motion, such as human motion. The sphere containing the magnetic ball is wrapped with one or more copper coils. When the ball moves, these coils are exposed to a time-varying magnetic flux and generate a voltage. The ball positioned with the spherical housing can move under a large range of non-specific motions.

Figure 13A:
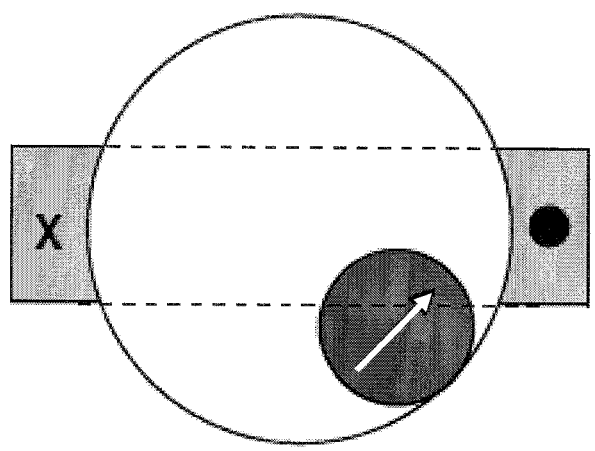
FIGS. 13A-13B show schematics of an equator-wrapped and an offset-wrapped harvesters, respectively, having a spherical magnet inside a spherical cage.
Figure 13B:
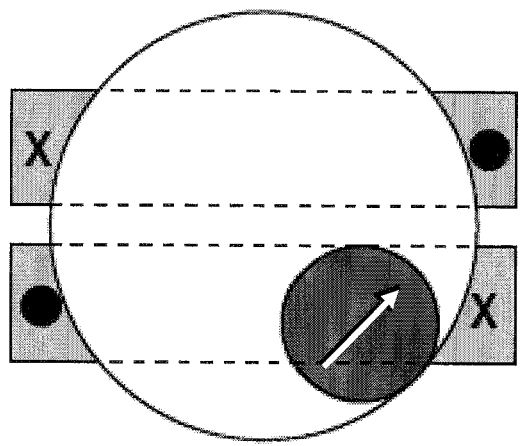

Two different spherical device architectures were investigated in this example, as shown in FIGS. 13A and 13B. The first design incorporates a single coil wrapped around the equator of the spherical cage containing the permanent magnet ball. The second design utilizes two series-connected, counter-wound coils that were offset on the northern and southern hemispheres. This second design can capture the magnetic flux in a more efficient manner depending on the ball's movement within the cavity. The two coils can also be in parallel and/or non-counter-wound.

For construction, composite powder/resin devices were fabricated using a Spectrum Z510 3D-printer (Spectrum Z™ 510. 2008. Z Corporation® Jan. 13, 2009. http://www.zcorp.com/Products/3D-Printers/Spectrum-Z510/spage.aspx.).

Figure 14:
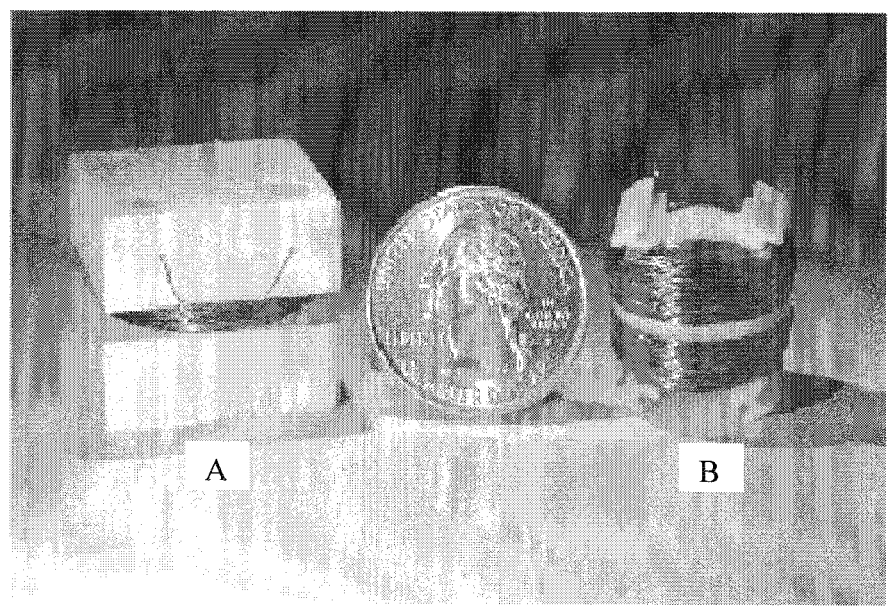
FIG. 14 show the (a) equator-wrapped and (b) offset-wrapped harvesters, as schematically shown in FIGS. 13A and 13B, respectively.

For both designs, two identical hemispherical structures were created with notches or pins on the outer surfaces to aid in the wire winding. After printing and infiltration with the composite bonding agent, the inner surfaces of the cavity were mechanically sanded to provide a smooth surface for the magnet ball. The two halves were then glued together to encapsulate the magnet ball, and then wound with 34-gauge copper wire in the appropriate configuration. Typical coil resistances varied from 10-60 Ohms. FIG. 14 shows some example constructions. Specific embodiments can have a rough surface on the inner surface of the housing and/or outer surface of the magnet. Such rough surfaces can enhance rotation of the magnet. The surfaces of the magnet and/or inner surface of housing can also incorporate a material, such as rubber or polymer, to enhance the elasticity of the interactions between the magnet and the housing.

There are a myriad of challenges for effective analytical modeling of the device architecture. First, there is the random nature of the human-induced input vibrations. Additionally, prediction and tracking of the mechanical motion (translation and rotation) of the ball within the spherical cavity is quite complicated. As such, a test plan was devised to experimentally characterize how the system performed under various input conditions.

Different constructions were characterized through parametric tests that varied (i) the number of coil turns (300-800), (ii) the overall system size (0.635-1.91 cm diameter cavity), and (iii) the ball-to-cavity diameter ratio (0.375-0.75). To accurately represent "real-world" operating conditions, the performances were characterized by a person walking (4 km/h) or running (14.5 km/h) on a treadmill with the harvester held in the user's hand or placed in their pocket.

Specific embodiments can utilize a magnet and housing having a ball-to-cavity ratio greater than 0.1, greater than 0.5, and greater than 0.8, respectively. Embodiments can utilize housing diameters in the rage 1 mm to 1 meter, 1 mm to 1 cm, and 1 cm to 2 cm, respectively. Locating the magnet, which can be a spheroid, such as an oblate or prolate spheroid, in the housing which can also be spheroidal, such as oblate or prolate, in this manner allows the magnet to rotate in any direction and translate in any direction.

Figure 15:
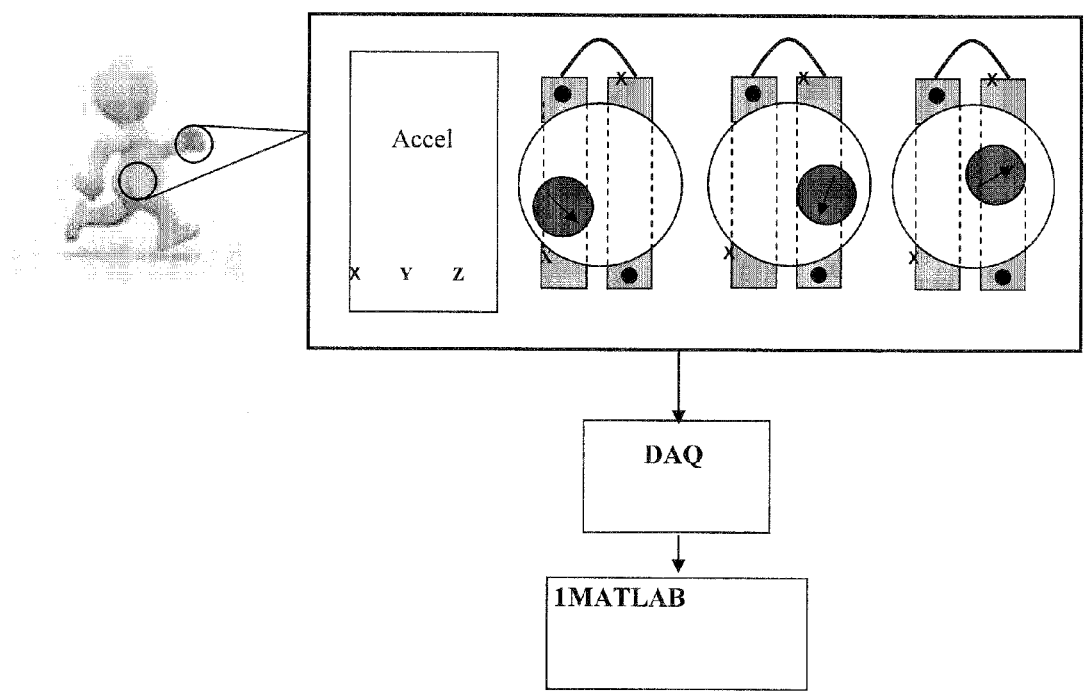
FIG. 15 shows a functional diagram showing the placement of the harvesters and the accelerometer test bed on the human body with connections leading the DAQ and the MATLAB analysis program.
Figures 16A, 16B, 16C, 16D:
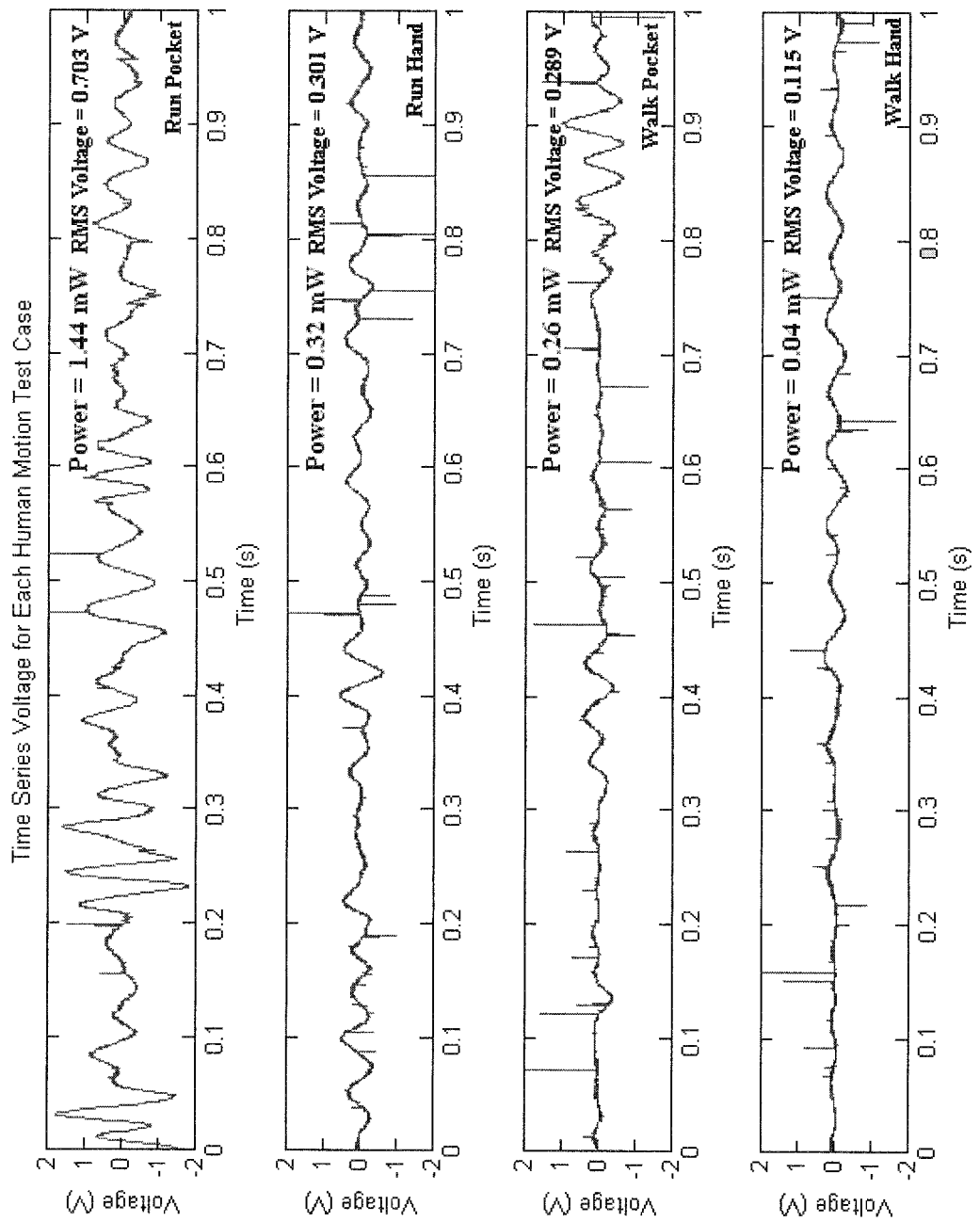
FIGS. 16A-16D show time series open-circuit voltage for the 500-turn, 1.27 cm diameter, 75% ball-to-cavity ratio, offset-wrapped coil harvester for a running human with the harvester in a pocket, a running human with a harvester in a hand, a waling human with the harvester in a pocket, and a walking human with the harvester in a hand, respectively.

A PC-based data acquisition test bed was used to enable multiple harvesters to be measured simultaneously under a common vibrational input, as shown in FIG. 15. A rapid prototyped powder/resin structure (18 cm×8 cm×3 cm) provided a rigid backbone onto which three harvesters could be attached along with a 3-axis accelerometer (Freescale Semiconductor KIT3109 MMA7260QE). The accelerometer data provided a reference between each set of tests to ensure consistent nominal acceleration levels. An 8-channel (differential) 12-bit USB connected data acquisition card (Measurement Computing Corporation 1208FS) provided a sampling rate of 8 kHz for measurement of the energy harvester open-circuit voltages and accelerometer data.

For each test, the open-circuit voltage waveforms were recorded, and then analyzed via MATLAB to determine the rms voltage. From this, the maximum deliverable power (assuming matched resistive load) and power density of each harvester were calculated. For the power density calculations, only the net volume occupied by the spherical cage structure and coil windings were included (as indicated in FIGS. 13A and 13B), but not the coil winding guides or additional mechanical supports. The three-axis vector acceleration data was coverted point-by-point to a vector magnitude given by $|a^{\overline{\omega}}|=\sqrt{a_x^2+a_y^2+a_z^2}$.

Figure 17:
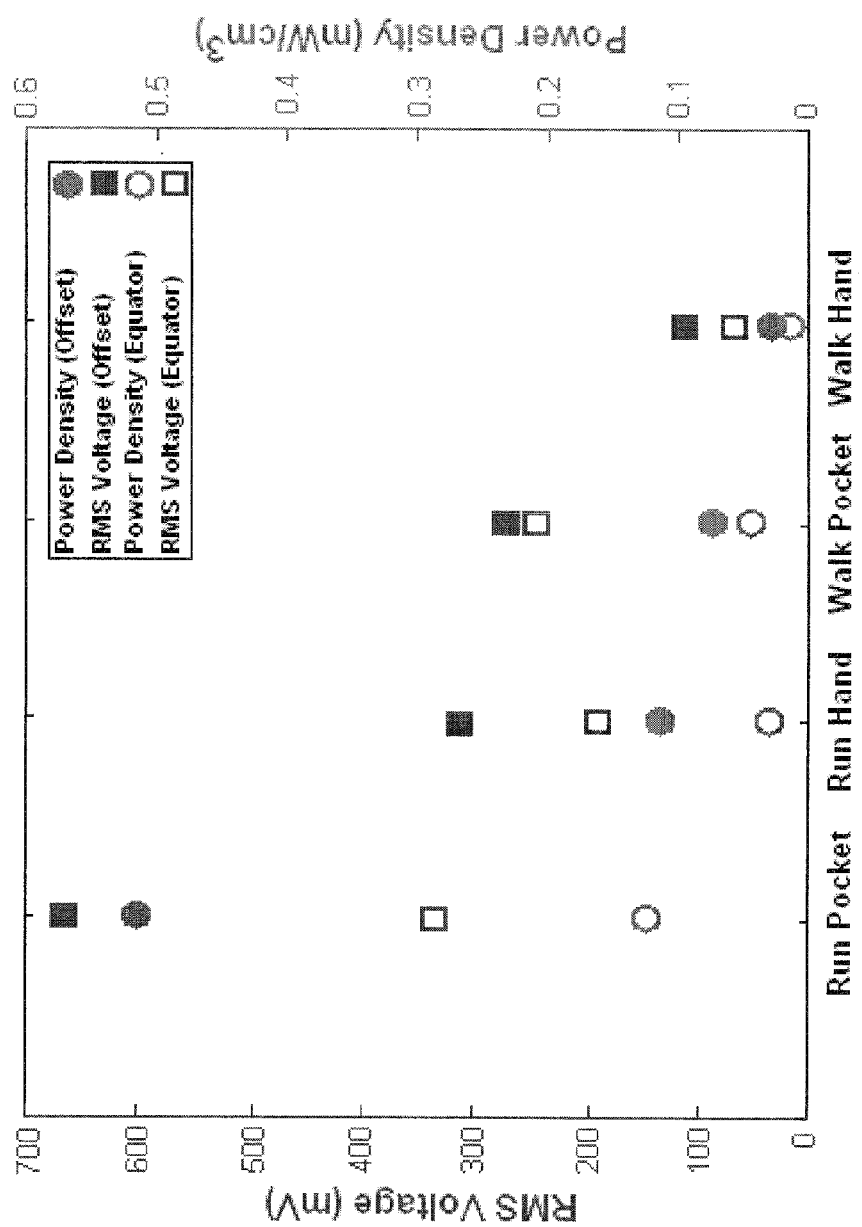
FIG. 17 shows a summary of best results of rms voltages (mV) and power densities (mW/cm$^3$) for both types of harvesters for a running human with the harvester in a pocket, a running human with a harvester in a hand, a waling human with the harvester in a pocket, and a walking human with the harvester in a hand.

FIGS. 16A-16D shows example open-circuit voltage waveforms for a 500-turn offset-wrapped harvester, illustrating the time-varying nature of the output voltage. The largest rms voltage (0.703 V) and predicted power (1.44 mW) were achieved when running with the device in the pocket. The best results (rms voltage and power density)—from various configurations—for the four test conditions are summarized in FIG. 17. The data indicates that the offset counter-wound coil design produced higher voltages and higher power densities compared to the equator-wrapped design.

Figure 18A:
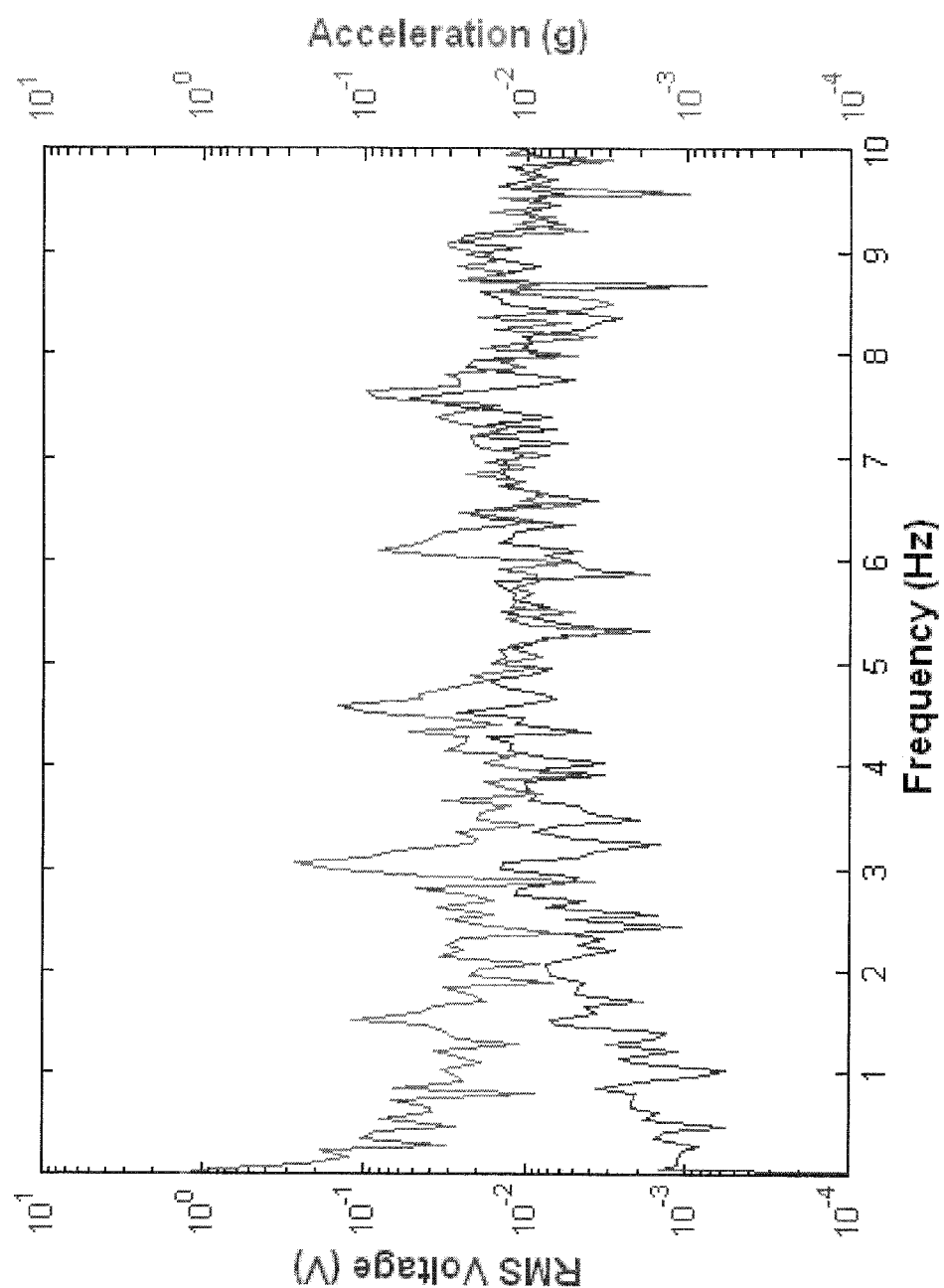
FIG. 18A shows an example Fast Fourier Transform (FFT) of energy harvester data and acceleration for the offset coil under the walking condition.

A Fast Fourier Transform Analysis was also conducted on all of the energy harvester data to examine the spectral content of the generated voltage signals. For all human motion input (running or walking) and regardless of the harvester's location (hand or pocket) the spectral content of the voltage data closely matched that of the vector magnitude acceleration data. An example FFT is shown in FIG. 18A, where noticeable peaks occur at ~1.5, 3, 4.5, 6, and 7.5 Hz. The frequency content for all of the measured accelerations and voltages was concentrated in the 1-10 Hz range, (i) confirming the low-frequency, wide-band content of human motion and (ii) indicating that the rolling magnetic harvesters can perform these low input frequencies. Also, since there are multiple peaks in both the acceleration and voltage data, the harvesters possess a broadband frequency response, taking full advantage of the wide spectral content of human motions. There is a clear decreasing voltage output as the frequency decreases to zero. This is a result of the time-varying nature of the magnetic induction electromechanical transduction, as the energy harvester will have zero output voltage for a static acceleration.

Figure 18B:
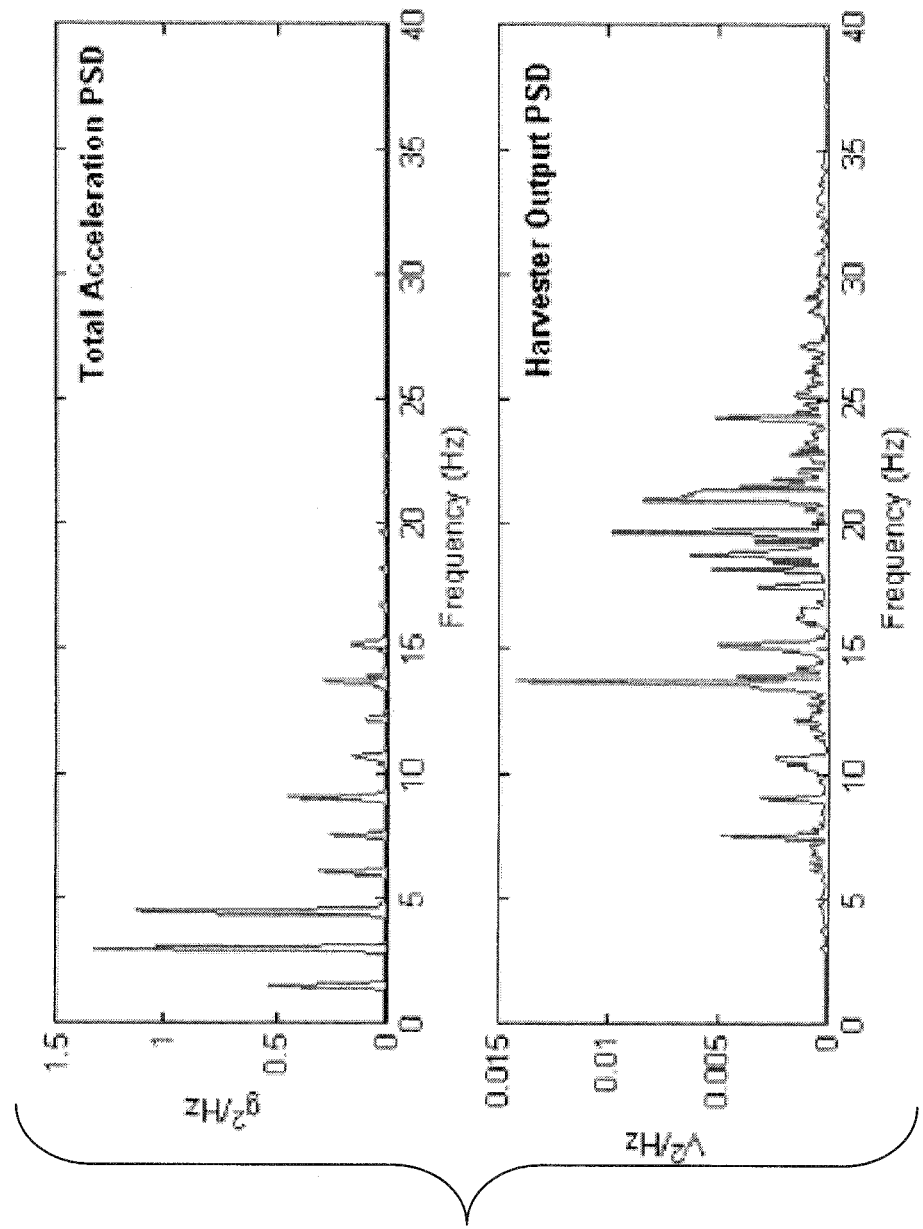
FIG. 18B shows an example power spectral density (PSD) of input acceleration and output voltage for the offset coil under the running condition.

The power spectral densities (PSD's) of the acceleration and voltage data were also computed to examine the spectral content of the input and output energy. PSD's were calculated using the "pwelch" command in MATLAB with a Hanning window and no overlap. For the acceleration data (a vector quantity), the PSD is calculated for each axis of acceleration and then summed together to form a vector magnitude acceleration PSD. An example result is shown in FIG. 18B, where noticeable acceleration peaks occur at harmonies of 1.5 Hz up to ~15 Hz. The frequency content for all of the measured human-motion cases was in the 1-15 Hz range as expected. Interestingly, the harvester output voltage usually possessed dominant frequency peaks in the range of 5-25 Hz. This higher frequency content is believed to be a result of the "ringing" that the magnetic sphere undergoes in the cavity. This low-frequency motional energy is "up-converted" to higher electrical frequencies via the free mechanical motion of the rolling ball.

These general results indicate that the rolling magnetic harvesters adequately respond to the low-frequency, wide-band content of human motion, and that the harvesters generate reasonably high output voltages with fairly wide-band spectral content. To better understand the performance tradeoffs of different designs under different human motions, results from the parametric tests are summarized in the next sections.

The first parametric test conducted varied the number of coil turns while keeping other parameters of the device constant (30% ball-to-cavity diameter ratio and 1.27 cm cavity diameter). For the offset coil, the total number of turns was divided into two series-connected coils in the northern and southern hemisphere of the device (half of the total number of turns in each hemisphere).

Figure 19:
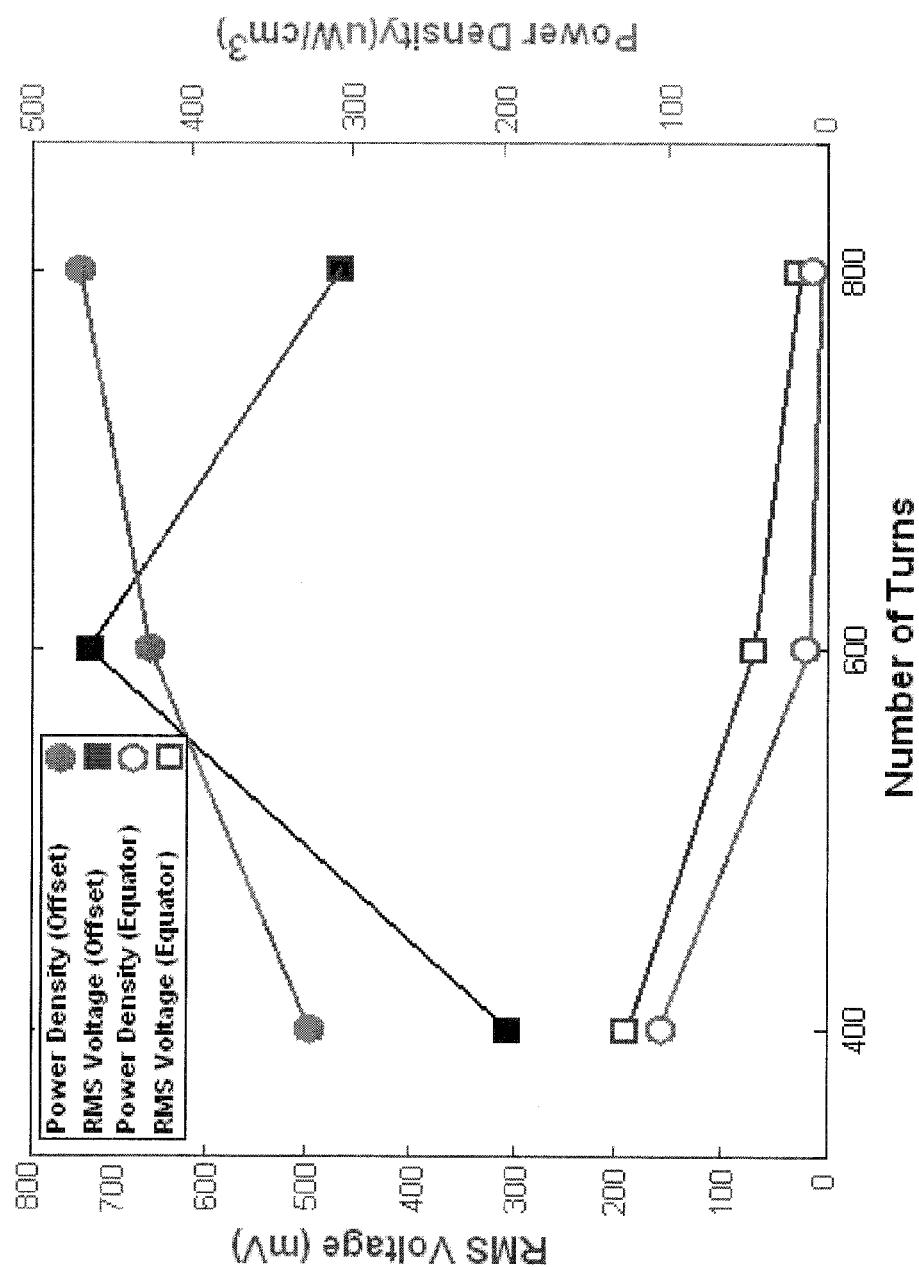
FIG. 19 shows rms voltages and power densities while varying the number of turns but maintaining a 30% ball-to-cavity diameter ratio and 1.27 cm cavity diameter while in the pocket under the running condition.

As seen in FIG. 19, the rms voltages and power densities decreased with an increase in the number of turns for the equator-wrapped coil. To explain this, it is hypothesized that there may be counteracting voltages in the coil due to its large size compared to the magnetic ball. For example, if the ball moves vertically through the center of the sphere, the flux may be increasing in the upper coil turns, while decreasing in the lower coil turns, thus conflicting with each other.

For the offset coil design, the voltage monotonically increased with increasing turns, but a maximum power density was achieved at 600 turns. Above this value, the volume is increasing faster than the power, resulting in this power density maximum. In other words, increasing the number of windings increased the maximum power output, but not the power density because of the larger overall volume. The additional coil turns are further from the magnetic ball, and thus not as magnetically coupled.

Figure 20:
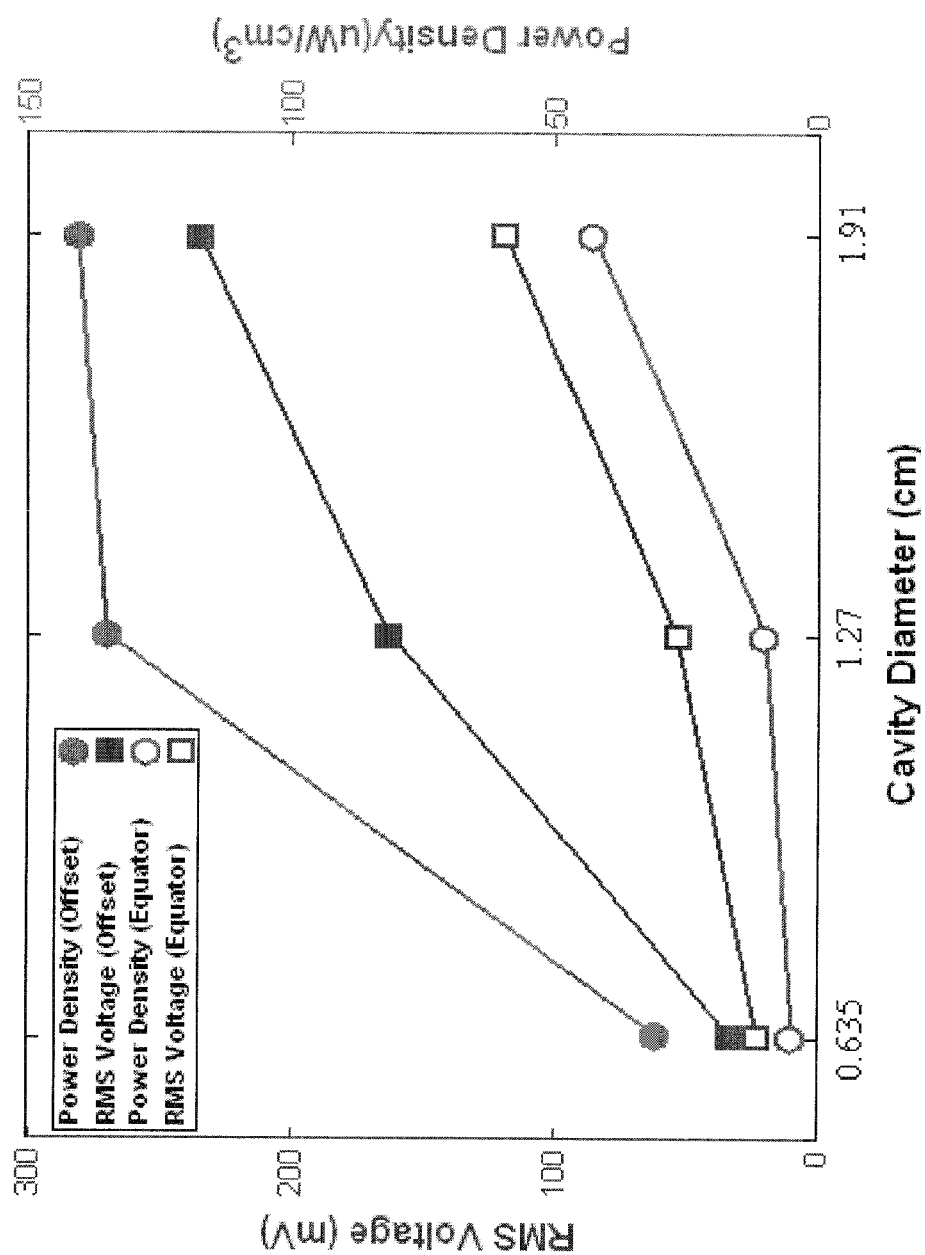
FIG. 20 shows rms voltages and power densities while varying the cavity diameter but maintaining 30% ball-to-cavity diameter ratios and 300 total turns while in the pocket under the running condition.

All of the harvesters tested were on the mesoscale (0.635-1.91 cm diameter cavity). However, it was important to examine the scalability of the harvesters for reduced system size. For this parametric variation, the ball-to-cavity ratio was held constant at 30%, and the total number of turns was held at 300 while running in the pocket as seen in FIG. 20. FIG. 20 shows the rms voltages and power densities of the harvesters as the overall size of the harvester was scaled down while running in the pocket. As the harvester size is decreased, the power density and rms voltages monotonically decrease for both types of harvesters, as might be expected from general theory (D. P. Arnold, "Review of Microscale Magnetic Power Generation", *IEEE Transactions on Magnetics*, Vol. 43, No. H, pp. 3940-3951, November, 2007).

Figure 21A:
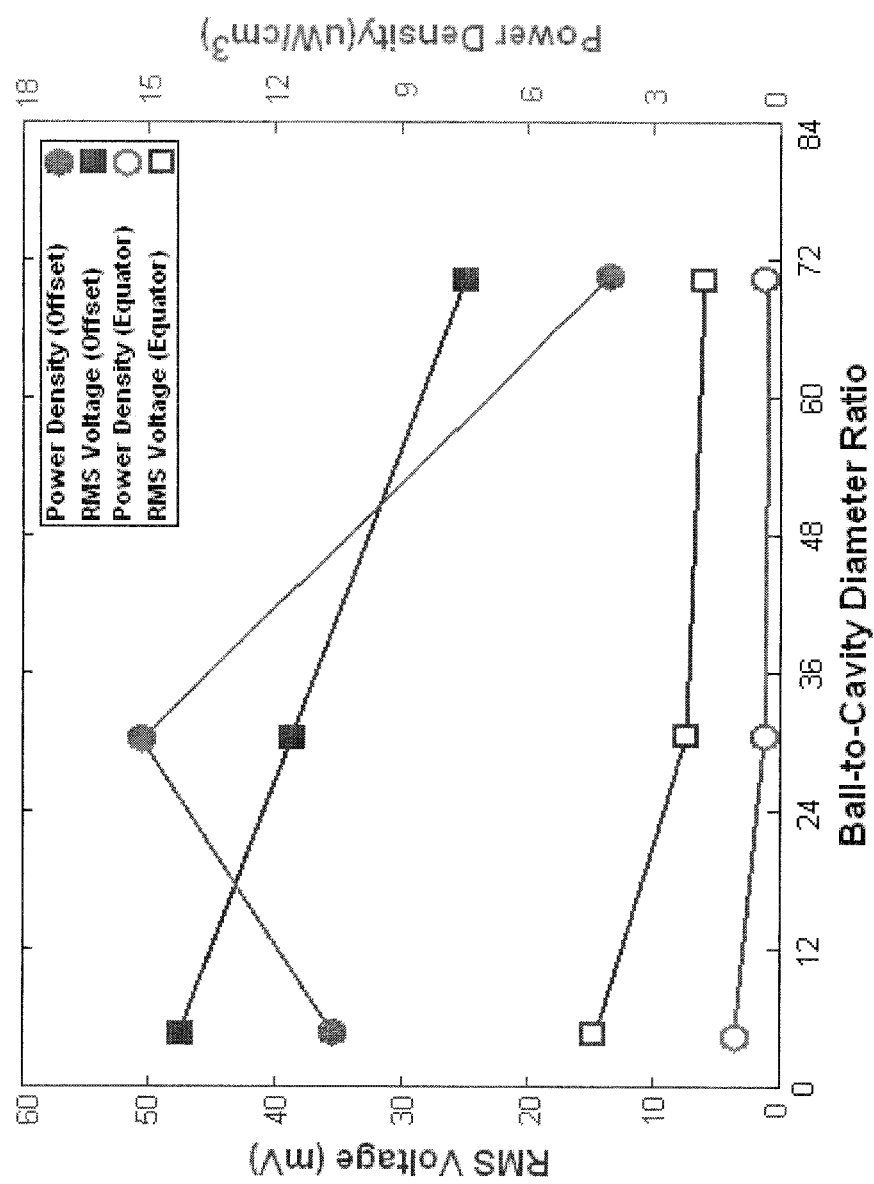
FIGS. 21A-21B show rms voltages and power densities while varying the ball-to-cavity diameter ratios but maintaining a 1.27 cm cavity diameter and 300 total turns for (a) walking condition and (b) running condition, respectively, while in the pocket.
Figure 21B:
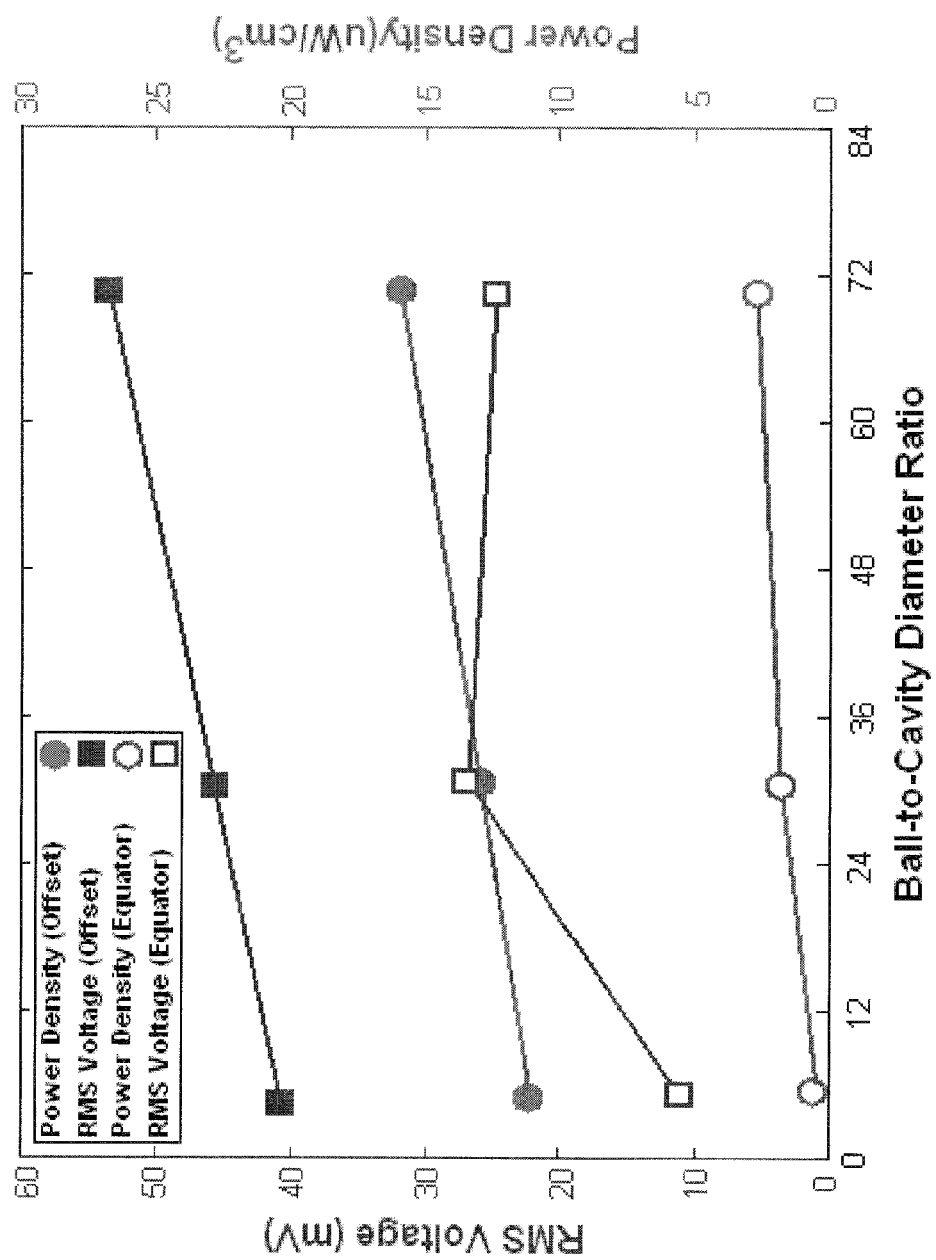

The final parameter that was varied was the ball-to-cavity diameter ratio. The experiments here yielded the most interesting results. While the other parametric variations showed consistent trends for the four different human motion test conditions, the optimal ball-to-cavity ratio was dependent upon the type of input vibration to the harvester. FIG. 21A shows variations for walking, and FIG. 21B shows the variations for running while in the pocket. If the harvester was being operated in the walking regime, it was better to have a smaller ball-to-cavity diameter ratio. However, if the input vibration was from running, the opposite was true.

A possible explanation is as follows. Since the vibration amplitude from walking is lower than that for running, a smaller ball desirable so that the ball can be excited into large motions in the cavity. In contrast, a running vibrational input produces higher forces, which can easily move a larger ball (which itself produces more magnetic flux and presumably is better coupled with the coil).

Several conclusions can be drawn from the parametric characterization process. In all cases, the offset-wrapped design exhibited higher voltages and power densities as compared to the equator-wrapped design.

For the dependence on coil turns, the equator-wrapped design showed decreasing voltage and power density with increasing coil turns whereas and the offset-wrapped design showed a peak power density for 600 turns. For the scalability test, there was a clear decrease in the rms voltage and power density with decreasing device size. When scaling from 1.9 cm to 0.64 cm diameter spheres, the offset coil design indicated a power density reduction of 71%, while the equator-wrapped power density was diminished by 98%.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A device, comprising:
    a magnet;
    a spheroidal housing having a hollow interior; and
    at least one coil positioned such that as the magnet moves within the hollow interior of the spheroidal housing, a corresponding at least one electric current is induced in the at least one coil, wherein the magnet is allowed to experience translational and rotational movement in any direction throughout the hollow interior of the spheroidal housing, wherein the diameter ratio of a diameter of the magnet and a diameter of the housing is in the range 0.375-0.75 or in the range 0.3-0.7.

2. The device according to claim 1, wherein the spheroidal housing is an oblate spheroid.

3. The device according to claim 1, wherein the spheroidal housing is a prolate spheroid.

4. The device according to claim 1, wherein the spheroidal housing is a sphere.

5. The device according to claim 4, wherein the magnet is spherical.

6. The device according to claim 1, wherein the magnet is spheroidal.

7. The device according to claim 6, wherein an inside surface of the spheroidal housing comprises a material that allows elastic interactions between the spheroidal magnet and the inside surface.

8. The device according to claim 7, wherein an outer surface of the spheroidal magnet comprises a second material that allows elastic interactions between the spheroidal magnet and the inside surface.

9. The device according to claim 8, wherein the second material and the first material are the same.

10. The device according to claim 8, wherein the second material that allows elastic interactions between the spheroidal magnet and the inside surface comprises a ferrofluid.

11. The device according to claim 7, wherein the material that allows elastic interactions between the spheroidal magnet and the inside surface comprises a ferrofluid.

12. The device according to claim 7, wherein the material that allows elastic interactions between the spheroidal magnet and the inside surface comprises a lubricating fluid introduced between the spheroidal magnet and the inside surface.

13. The device according to claim 6, wherein an inside surface of the spheroidal housing and/or an outer surface of the spheroidal magnet contains coating layers or coating materials.

14. The device according to claim 1, wherein the magnet is spherical.

15. The device according to claim 1, wherein the magnet is an oblate spheroid.

16. The device according to claim 1, wherein the magnet is prolate spheroid.

17. The device according to claim 1, further comprising:
    circuitry, wherein the circuitry receives power produced by the at least one electric current.

18. The device according to claim 1, wherein an inside surface of the spheroidal housing is smooth.

19. The device according to claim 1, wherein an inside surface of the spheroidal housing is rough.

20. The device according to claim 1, wherein the at least one coil is a single coil positioned proximal an equator of the spheroidal housing.

21. The device according to claim 1, wherein the at least one coil comprises a first coil offset from an equator of the spheroidal housing in a first direction and a second coil offset from the equator in a second direction opposite the first direction.

22. The device according to claim 21, wherein the first coil and the second coil are in series.

23. The device according to claim 21, wherein the first coil and the second coil are parallel.

24. The device according to claim 22, wherein the second coil is wound in an opposite direction with respect to the first coil.

25. The device according to claim 1, wherein a diameter of the spheroidal housing is in a range 1 mm to 1 meter.

26. The device according to claim 1, wherein a diameter of the spheroidal housing is in a range 1 mm to 1 cm.

27. The device according to claim 1, wherein a diameter of the spheroidal housing is in a range 1 cm to 2 cm.

28. The device according to claim 1, wherein an outside surface of the spheroidal housing comprises a material that increases a permeability of a surrounding media.

29. The device according to claim 28, wherein the material that increases the permeability of the surrounding media is a ferrofluid.

30. The device according to claim 1, wherein the magnet comprises a permanent magnet shell, wherein the permanent magnet shell comprises a high permeability material.

31. The device according to claim 1, wherein the hollow interior is an oval shaped hollow interior.

32. The device according to claim 1, wherein an inside surface of the hollow interior contains bumps or ridges.

33. The device according to claim 1, wherein the diameter ratio of a diameter of the magnet and a diameter of the housing is in the range 0.375-0.75.

34. The device according to claim 1, wherein the diameter ratio of a diameter of the magnet and a diameter of the housing is in the range 0.3-0.7.

35. A device, comprising:
a magnet;
a spheroidal housing; and
at least one coil positioned such that as the magnet moves within the spheroidal housing, a corresponding at least one electric current is induced in the at least one coil, wherein a diameter ratio of a diameter of the magnet to a diameter of the spheroidal housing is greater than 0.8.

36. A method for harvesting vibrational energy, comprising:
providing a magnet;
providing a spheroidal housing having a hollow interior; and
providing at least one coil positioned such that as the magnet moves within the hollow interior of the spheroidal housing, a corresponding at least one electric current is induced in the at least one coil, wherein the magnet is allowed to experience translational and rotational movement in any direction throughout the hollow interior of the spheroidal housing, wherein the diameter ratio of a diameter of the magnet and a diameter of the housing is in the range 0.375-0.75 or in the range 0.3-0.7.

37. The method according to claim 36, wherein the diameter ratio of a diameter of the magnet and a diameter of the housing is in the range 0.375-0.75.

38. The method according to claim 36, wherein the diameter ratio of a diameter of the magnet and a diameter of the housing is in the range 0.3-0.7.

39. The method according to claim 36, wherein the spheroidal housing is an oblate spheroid.

40. The method according to claim 36, wherein the spheroidal housing is a prolate spheroid.

41. The method according to claim 36, wherein the spheroidal housing is a sphere.

42. The method according to claim 41, wherein the magnet is spherical.

43. The method according to claim 36, wherein the magnet is spheroidal.

44. The method according to claim 43, wherein an inside surface of the spheroidal housing and/or an outer surface of the spheroidal magnet contains coating layers or coating materials.

45. The method according to claim 36, wherein the magnet is spherical.

46. The method according to claim 36, wherein the magnet is an oblate spheroid.

47. The method according to claim 36, wherein the magnet is a prolate spheroid.

48. The method according to claim 36, further comprising:
providing circuitry, wherein the circuitry receives power produced by the at least one electric current.

49. The method according to claim 36, wherein an inside surface of the spheroidal housing is smooth.

50. The method according to claim 36, wherein an inside surface of the spheroidal housing is rough.

51. The method according to claim 36, wherein the at least one coil is a single coil positioned proximal an equator of the spheroidal housing.

52. The method according to claim 36, wherein the at least one coil comprises a first coil offset from an equator of the spheroidal housing in a first direction and a second coil offset from the equator in a second direction opposite the first direction.

53. The method according to claim 52, wherein the first coil and the second coil are in series.

54. The method according to claim 53, wherein the second coil is wound in an opposite direction with respect to the first coil.

55. The method according to claim 53, wherein an inside surface of the spheroidal housing comprises a material that allows elastic interactions between the spheroidal magnet and the inside surface.

56. The method according to claim 55, wherein an outer surface of the spheroidal magnet comprises a second material that allows elastic interactions between the spheroidal magnet and the inside surface.

57. The method according to claim 56, wherein the second material and the first material are the same.

58. The method according to claim 56, wherein the second material that allows elastic interactions between the spheroidal magnet and the inside surface comprises a ferrofluid.

59. The method according to claim 55, wherein the material that allows elastic interactions between the spheroidal magnet and the inside surface comprises a ferrofluid.

60. The method according to claim 55, wherein the material that allows elastic interactions between the spheroidal magnet and the inside surface comprises a lubricating fluid introduced between the spheroidal magnet and the inside surface.

61. The method according to claim 52, wherein the first coil and the second coil are parallel.

62. The method according to claim 36, wherein a diameter of the spheroidal housing is in a range 1 mm to 1 meter.

63. The method according to claim 36, wherein a diameter of the spheroidal housing is in a range 1 mm to 1 cm.

64. The method according to claim 36, wherein a diameter of the spheroidal housing is in a range 1 cm to 2 cm.

65. The method according to claim 36, wherein an outside surface of the spheroidal housing comprises a material that increases a permeability of a surrounding media.

66. The method according to claim 65, wherein the material that increases the permeability of the surrounding media is a ferrofluid.

67. The method according to claim 36, wherein the magnet comprises a permanent magnet shell, wherein the permanent magnet shell comprises a high permeability material.

68. The method according to claim 36, wherein the hollow interior is an oval shaped hollow interior.

69. The method according to claim 36, wherein an inside surface of the hollow interior contains bumps or ridges.

70. A method for harvesting vibrational energy, comprising:
   providing a magnet;
   providing a spheroidal housing; and
   providing at least one coil positioned such that as the magnet moves within the spheroidal housing, a corresponding at least one electric current is induced in the at least one coil,
   wherein the diameter ratio of a diameter of the magnet and a diameter of the housing is greater than 0.8.

* * * * *

UNITED STATES PATENT AND TRADEMARK OFFICE
CERTIFICATE OF CORRECTION

| | | |
|---|---|---|
| PATENT NO. | : 8,729,747 B2 | Page 1 of 1 |
| APPLICATION NO. | : 12/848606 | |
| DATED | : May 20, 2014 | |
| INVENTOR(S) | : David Patrick Arnold and Benjamin James Bowers | |

It is certified that error appears in the above-identified patent and that said Letters Patent is hereby corrected as shown below:

In the Specification

Column 11,
Line 18, "No. H," should read --No. 11,--.

Signed and Sealed this
Fourteenth Day of October, 2014

Michelle K. Lee
*Deputy Director of the United States Patent and Trademark Office*